(12) United States Patent
VanderSpek et al.

(10) Patent No.: US 10,114,831 B2
(45) Date of Patent: Oct. 30, 2018

(54) DELTA VERSION CLUSTERING AND RE-ANCHORING

(71) Applicant: Exagrid Systems, Inc., Westborough, MA (US)

(72) Inventors: Adrian VanderSpek, Worcester, MA (US); Jamey C. Poirier, Grafton, MA (US); Lucas H. Makosky, Harvard, MA (US); Ashok T. Ramu, Waltham, MA (US); Mark Bennett Hecker, Northborough, MA (US); Thomas G. Hansen, Bellingham, MA (US); David G. Therrien, Nashua, NH (US)

(73) Assignee: Exagrid Systems, Inc., Westborough, MA (US)

( * ) Notice: Subject to any disclaimer, the term of this patent is extended or adjusted under 35 U.S.C. 154(b) by 671 days.

(21) Appl. No.: 13/961,259

(22) Filed: Aug. 7, 2013

(65) Prior Publication Data

US 2014/0052700 A1 Feb. 20, 2014

Related U.S. Application Data

(60) Provisional application No. 62/683,791, filed on Aug. 16, 2012.

(51) Int. Cl.
*G06F 17/30* (2006.01)

(52) U.S. Cl.
CPC .. *G06F 17/30153* (2013.01); *G06F 17/30162* (2013.01)

(58) Field of Classification Search
None
See application file for complete search history.

(56) References Cited

U.S. PATENT DOCUMENTS

| | | |
|---|---|---|
| 5,574,906 A | 11/1996 | Morris |
| 5,729,743 A | 3/1998 | Squibb |

(Continued)

FOREIGN PATENT DOCUMENTS

| | | |
|---|---|---|
| EP | 0 774 720 A2 | 5/1997 |
| EP | 0 774 720 A3 | 5/1997 |

(Continued)

OTHER PUBLICATIONS

Burns, Randal C., and Darrell DE Long. "Efficient distributed backup with delta compression." Proceedings of the fifth workshop on I/O in parallel and distributed systems. ACM, 1997.*

(Continued)

*Primary Examiner* — Boris Gorney
*Assistant Examiner* — James Heffern
(74) *Attorney, Agent, or Firm* — Mintz Levin Cohn Ferris Glovsky and Popeo, P.C.

(57) ABSTRACT

A system, a method, and a computer program product for delta version clustering and re-anchoring are provided. A first anchor having a plurality of delta-compressed versions of data dependent on the first anchor is generated. The first anchor and the plurality of delta-compressed versions form a cluster. A second anchor is generated. The first anchor is replaced with the second anchor. The replacing includes re-computing at least one delta-compressed version in the plurality of delta-compressed versions to be dependent on the second anchor. The second anchor replaces the first anchor as an anchor of the cluster.

81 Claims, 17 Drawing Sheets

(56) References Cited

U.S. PATENT DOCUMENTS

| | | | |
|---|---|---|---|
| 5,813,017 A | 9/1998 | Morris | |
| 7,562,186 B2 | 7/2009 | Li et al. | |
| 7,962,520 B2 | 6/2011 | Patterson et al. | |
| 8,412,848 B2 | 4/2013 | Therrien et al. | |
| 8,447,740 B1 | 5/2013 | Huang et al. | |
| 8,812,738 B2 | 8/2014 | Therrien et al. | |
| 8,898,120 B1 | 11/2014 | Efstathopoulos | |
| 8,972,672 B1* | 3/2015 | Wallace et al. | 711/154 |
| 2002/0073106 A1* | 6/2002 | Parker et al. | 707/200 |
| 2007/0239945 A1* | 10/2007 | Li et al. | 711/154 |
| 2008/0077607 A1 | 3/2008 | Gatawood et al. | |
| 2008/0195677 A1* | 8/2008 | Sudhakar et al. | 707/204 |
| 2008/0270729 A1 | 10/2008 | Reddy et al. | |
| 2008/0294660 A1 | 11/2008 | Patterson et al. | |
| 2010/0306412 A1* | 12/2010 | Therrien et al. | 709/247 |
| 2011/0119240 A1 | 5/2011 | Shapira | |
| 2012/0303680 A1* | 11/2012 | McLennan et al. | 707/821 |
| 2013/0024435 A1 | 1/2013 | Poirier et al. | |
| 2013/0066868 A1 | 3/2013 | Hecker et al. | |
| 2016/0253351 A1 | 9/2016 | Hansen et al. | |
| 2017/0046360 A1 | 2/2017 | Therrien et al. | |

FOREIGN PATENT DOCUMENTS

| | | |
|---|---|---|
| EP | 0 774 720 B1 | 5/1997 |
| EP | 0 981 099 A2 | 2/2000 |
| EP | 0 981 099 A3 | 2/2000 |
| EP | 2 571 171 A2 | 3/2013 |
| EP | 2 571 171 A3 | 3/2013 |
| EP | 2 698 732 A1 | 2/2014 |
| EP | 3 062 227 A1 | 8/2016 |
| WO | WO-01/52116 A1 | 7/2001 |
| WO | WO-01/52116 A8 | 7/2001 |

OTHER PUBLICATIONS

1997 Research Paper, *Efficient Distributed Backup with Delta Compression* (Randal C. Burns, Darrell D.E. Long).

2000 Research Paper, *File System Support for Delta Compression* (Joshua P. MacDonald).

2002 Research Paper, *Cluster-based Delta Compression of a Collection of Files* (Zan Ouyang, Nasir Memon, Torsten Suel, Dimitre Trendafilov).

Algorithms for Delta Compression and Remote File Synchronization (Suel, Memon); 2002.

Anonym: "Database transaction", Wikipedia, Apr. 13, 2011, pp. 1-3, Retrieved from the Internet: URL:http://web.archive.org/web/20110413204702/http://en.wikipedia.org/wiki/Database transaction.

Anonym: "Transaction processing system",Wikipedia, Feb. 19, 2011, pp. 1-6, Retrieved from the Internet: URL:http://web.archive.org/web/20110219211439/http://en.wikipedia.org/wiki/TransactionProcessing System.

Extended European Search Report dated Mar. 18, 2013 for EP12184324.7, filed Sep. 13, 2012, 8 pages.

Extended European Search Report dated Nov. 22, 2013, for EP Application No. 13180747.1, filed Aug. 16, 2013, 5 pages.

Extended European Search Report dated Aug. 2, 2016, for EP Application No. 16157662.4, filed Feb. 26, 2016, 7 pages.

Extended European Search Report dated Mar. 23, 2017, for EP Application No. EP16184063.2, filed on Aug. 12, 2016, 8 pages.

File System Support for Delta Compression (Josh P. MacDonald); 2000.

Time and Space Tradeoffs in Version Control (Eric Sink); 2009.

* cited by examiner

DELTA VERSION CLUSTERING AND RE-ANCHORING

CROSS-REFERENCE TO RELATED APPLICATIONS

The present application claims priority to U.S. Provisional Patent Application No. 61/683,791 to Vanderspek, filed Aug. 16, 2012, and entitled "Delta Version Clustering and Re-Anchoring," and incorporates its disclosure herein by reference in its entirety.

TECHNICAL FIELD

In some implementations, the current subject matter relates to data processing, and in particular, to delta version clustering, a data structure that can improve performance and scalability of managing temporal versions of delta-compressed data.

BACKGROUND

Data processing applications allow their users to create, change, modify, and delete files over time. A file version represents a particular iteration of a file at a point in time. Such iterations can be the same or can be different from the originally created file and/or from its other versions. Some files may have no versions (i.e., only a single original file), only a few versions, or a plurality of versions. An efficient way to store versions of files or segments of files over time is by delta compressing versions against each other and storing them in a version chain. Version chains are typically linear data structures that hold contents of versions of the same or similar files or segments of files over time. For example, a segment that is originally created and then modified four times can have a version chain consisting of a head and four versions, which would represent a version of the file or file segment at five different points in time.

To reduce storage space, file versions are typically stored in a compressed format, such as a delta-compressed format. Delta-compression or delta-encoding is a way of storing or transmitting data in the form of differences between versions of a file or file segment rather than complete files. The differences are recorded in discrete files, which are called "patch files" or "deltas." There are many conventional applications that employ delta-compression or delta-encoding. Examples of these include source control systems, backup data deduplication systems, content management systems, software distribution systems, and/or any other systems.

In some cases, the version chains can be represented as linear reverse delta version chains, where the most recent version is stored in its whole form and all earlier versions could be stored as difference/delta files from each other in the linear chain. Conversely, a forward delta version chain maintains the original version of a file in its whole form, and creates delta files forward from that first version.

While a linear arrangement of delta versions can be one of the simplest data structures for version chains, there are operations on version chains that make the linear arrangement of deltas inefficient, more prone to data loss, and/or cumbersome, as indicated below. One of these operations includes accessing an earlier version of a file, which is a linear process whose processing time is directly proportional to the position of that version along the length of the version chain. The shorter the distance from the most recent version to the desired version within the reverse delta version chain, the faster the execution time to recreate that earlier version. However, this operation can consume a greater amount of time and processing power as the distance from the most recent version to the desired version increases.

Another operation includes deleting a single delta version from anywhere in the version chain except the ends of the chain. This can require decompressing of all more recent versions of the version to be deleted in order to remove that version and reconnect its two adjacent versions to each other. This can again be a time-and-processing intensive operation.

If a delta version within a version chain is determined to have become corrupted, all earlier versions are rendered unavailable since their regeneration is based on all of the more recent versions to be error free. Hence, there is a need to reduce the probability of data loss by significantly reducing the number of deltas that must be error free in order to successfully restore an earlier version of a segment or file.

SUMMARY

In some implementations, the current subject matter relates to a method for performing a delta version clustering and reanchoring. The method can include generating a first anchor having a plurality of delta-compressed versions of data dependent on the first anchor, the first anchor and the plurality of delta-compressed versions form a cluster, generating a second anchor, and replacing the first anchor with the second anchor. Replacing of the first anchor can include re-computing at least one delta-compressed version in the plurality of delta-compressed versions to be dependent on the second anchor, wherein the second anchor replaces the first anchor as an anchor of the cluster. At least one of the generating the first anchor, the generating the second anchor, and the replacing is performed on at least one processor.

In some implementations, the current subject matter can include one or more of the following optional features. The second anchor can be created based on a determination that the plurality of versions meets at least one condition. At least one condition can include at least one of the following: a size of at least one zone in at least delta-compressed version, a number of delta-compressed versions associated with the first anchor, an age of the first anchor, and a zone stamp edit distance. In some implementations, the creation of the second anchor can include computing a reverse delta between the first anchor and the second anchor and delta-compressing the at least one delta-compressed version against the second anchor.

In some implementations, the method can further include storing the second anchor at a first storage location, receiving a new version of data, wherein the new version of data represents a version of data different from a version of data represented by at least one delta-compressed version of data in the plurality of delta-compressed versions, decompressing the second anchor at the first storage location, creating a forward delta-compressed version representative of the differences between the uncompressed second anchor and the received new version of data, and associating the created forward delta-compressed version with the second anchor. The method can further include storing the second anchor at a second storage location, transmitting the created forward delta-compressed version to the second storage location, and associating the second anchor stored at the second location with the transmitted forward delta-compressed version. In some implementations, the second storage location can be a disaster recovery storage location.

In some implementations, the method can include determining that the second anchor is to be deleted. This determination can include receiving a request to delete the second anchor and determining whether the second anchor includes at least one forward delta-compressed version dependent on the second anchor and marking the at least one forward delta-compressed version dependent on the second anchor for deletion. This determination can include determining whether the second anchor includes only forward delta-compressed versions dependent on the second anchor, deleting all forward delta-compressed versions, and deleting the second anchor. The determination can also include determining whether the second anchor includes at least one reverse delta-compressed version dependent on the second anchor, wherein the at least one reverse delta-compressed version includes at least one forward delta-compressed version dependent on the at least one delta-compressed version, deleting all forward delta-compressed versions dependent on the at least one reverse delta-compressed version, deleting the at least one reverse delta-compressed version after deleting all forward delta-compressed versions dependent on the at least one reverse delta-compressed version, determining whether the second anchor includes forward delta-compressed versions dependent on the second anchor, deleting all forward delta-compressed versions dependent on the second anchor but not dependent on the at least one reverse delta-compressed version, and deleting the second anchor after deleting the at least one reverse delta-compressed version dependent on the second anchor and all forward delta-compressed versions dependent on the second anchor. In some implementations, the determination can further include determining whether the second anchor includes at least one of the following: a forward delta-compressed version dependent on the second anchor and a reverse delta-compressed version dependent on the second anchor, selecting at least one delta-compressed version as a third anchor, re-computing at least one delta-compressed version dependent on the second anchor to be dependent on the third anchor, associating the re-computed at least one delta-compressed version with the third anchor, and deleting the second anchor. The deletion of the selected anchor can be delayed until all forward delta-compressed versions that are dependent on the selected anchor are deleted. The deletion of the second anchor can be performed immediately after the third anchor is created.

In some implementations, the method can further include selecting a delta-compressed version in the plurality of versions for deletion, determining whether the selected delta-compressed version is a forward delta version, and deleting the selected forward delta version without deletion of the second anchor and other delta-compressed versions dependent on the second anchor.

In some implementations, the determination of whether to delete an anchor can include determining whether the second anchor includes at least one forward delta-compressed version and at least one reverse delta-compressed version dependent on the second anchor, deleting the at least one forward delta-compressed versions dependent on the second anchor, and preventing deletion of the second anchor until the at least one reverse delta-compressed version is deleted.

In some implementations, the method can further include accessing a version of data represented by a delta-compressed version of data dependent on the second anchor without decompressing another delta-compressed version of data dependent on the second anchor, whereby access time to the version of data is reduced.

In some implementations, the method can further include determining whether a delta-compressed version in the cluster is found to be unrecoverable. If the unrecoverable delta-compressed version is a forward delta-compressed version, then at least another can be recoverable. If the unrecoverable delta-compressed version is a reverse delta-compressed version, at least one forward delta-compressed version dependent on the unrecoverable reverse delta-compressed version can be unrecoverable and at least one delta-compressed version in the cluster that is not dependent on the unrecoverable reverse delta-compressed version can be recoverable.

In some implementations, the method can further include determining whether to duplicate the second anchor to create a copy of the second anchor, duplicating the second anchor. The determination of whether to duplicate the second anchor can be based on at least one of the following: size of the second cluster, a number of delta-compressed versions dependent on the second anchor, a number of delta-compressed versions added to the second cluster during a predetermined period of time, and a logical grouping of the second cluster and at least another version cluster. The first anchor can be stored in a first storage location and the duplicated second anchor is stored in a second storage location. In some implementations, the method can further include determining whether the second cluster is corrupted, and preventing duplication of the second cluster. The duplicating can include performing a checksum of the second cluster by splitting the second cluster into a plurality of data segments, performing a checksum of at least one data segment in the plurality of data segments, storing checksummed data segments, and logically aggregating the checksummed data segments into a third anchor for replacing the second anchor.

In some implementations, the method can further include storing the cluster anchored by the second anchor at a first storage location and storing the cluster anchored by the second anchor at a second storage location without re-computing the second cluster. The second storage location can be a cloud storage. Storing at the second storage location can include storing metadata associated with the second cluster at the second storage location and a catalog file, wherein the stored metadata is used to update the stored second cluster at the second storage location based on an update to the stored second cluster at the first storage location and the catalog file includes at least one pointer to a metadata having a link to an actual data represented by the metadata. The update can include at least one of the following: deletion of the at least one delta-compressed version dependent on the second anchor, addition of a new delta-compressed version to be dependent on the second anchor, deletion of the second anchor, and changing the second cluster. The metadata can include at least of the second anchor and the delta-compressed versions dependent on the second anchor. The stored metadata can be used to recreate the second anchor and the delta-compressed versions dependent on the second anchor in the event of an unavailability of the first storage location. The catalog file can be a most recent catalog file containing a list of all active tapefiles representing data stored at the first storage location. The most recent catalog file can be referenced when recreating at least one version of data at the second storage location in the event of an unavailability of the first storage location.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
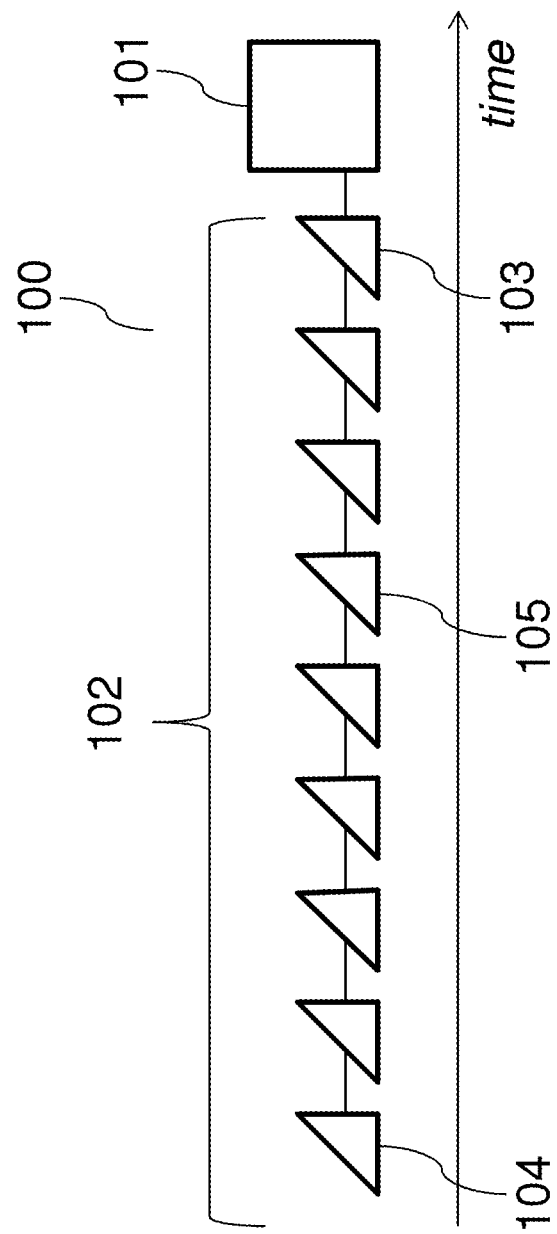
FIG. 1 illustrates an exemplary reverse delta version chain.

To address these and potentially other deficiencies of currently available solutions, one or more implementations of the current subject matter provide methods, systems, articles or manufacture, and the like that can, among other possible advantages, provide systems and methods for providing systems, methods, and computer program products for delta-version clustering and re-anchoring.

In some implementations, the current subject matter describes a novel way to store original files and their associated delta files as version clusters in order to improve performance and throughput, to enable solid state disk ("SSD") caching, and enable the use of simple storage services (e.g., Amazon S3), as a disaster recovery site.

In some implementations, the current subject matter relates to efficient processing and organization of the original files and their associated delta patch files, which are the result of executing delta compression methods In some implementations, the current subject matter can provide a computer-implemented system, method, and computer-program product that can generate a first anchor having a plurality of delta-compressed versions of data dependent on the first anchor. The first anchor and the plurality of delta-compressed versions can form a cluster. A second anchor can be also generated. The first anchor can be replaced with the second anchor. The replacement can include performing a re-computing of at least one delta-compressed version in the plurality of delta-compressed versions to be dependent on the second anchor. The second anchor can replace the first anchor as an anchor of the cluster.

Conventional data structures for maintaining relationships between collections of delta-compressed patch files include forward and reverse linear delta version chains but they do not implement version clustering with re-anchoring, in contrast the current subject matter. Some such conventional structures relate to version jumping schemes which create a completely new version jumping group when an average size of all of the compressed data divided by the size of all of the uncompressed data is greater than earlier minima. Other conventional structures include an application of forward and reverse delta chains in the creation of a versioned file system, called Xdelta File System ("XDFS"). Yet other conventional systems implement clustering of files into a single large directed and weighted graph, but do not implement maintaining a disconnected collection of version clusters, or re-anchoring, as described herein. Additionally, conventional systems also implement a two-level delta coding structure, where level "$d_1$" represents delta versions of original segments and level "d$_2$" represents delta versions of level d$_1$ delta files, but lack version clustering or re-anchoring.

In some implementations, and in contrast to deficiencies of the conventional systems discussed above, the current subject matter can include a version clustering structure and re-anchoring model that can replace conventional reverse linear delta version chains. The current subject matter system can provide at least the following benefits: an improvement in the performance of adding new versions, a predictable restore times for any version, a minimal performance degradation for file restores, an operation that is infrequently executed, a simplification of file purging and deletion as there are far fewer serial delta version dependencies, an enablement of creating more highly available version clusters via anchor redundancy, an enablement of solid state disk ("SSD") caching to further improve the performance of adding new versions to version clusters, and/or various other advantages. Additionally, using the current subject matter system, public data cloud services can be enabled by elimination of a need to perform any second-site computation on version clusters.

In some implementations, in a version clustering model, version clusters can be retained in a reverse linear delta version chain structure, and can shorten the mainline trunk of the linear version chain by grouping all related versions within a backup stream transaction that were found to be similar to each other into a version cluster. The co-pending, co-owned U.S. patent application Ser. No. 13/273,080, filed Oct. 31, 2011 and disclosure of which is incorporated herein by reference in its entirety, discloses a transaction-limited version clustering. The version clustering model therein can:

employ version jumping instead of arranging versions and version clusters into a linear chain;

maintain the first version as the anchor from which all other delta versions are compared against instead of always maintaining the most recent version at the head of the version chain as the version to be delta compressed against.

In some implementations, the current subject matter relates to a version clustering structure and a re-anchoring model, which, instead of creating a completely new version chain to account for increasingly larger deltas, performs re-anchoring that can replace a current anchor with a delta that is computed as the difference between the most recent version and the original anchor. This new anchor can become a point in the version cluster from which all future versions to be delta compressed against. The following discussion illustrates the process of re-anchoring in more detail, along with various exemplary applications.

1. Reverse Linear Delta Version Chains

FIG. 1 illustrates a conventional reverse linear delta version chain 100. The version chain includes a head 101 and a plurality of delta or patch version files 102. The head 101 of the version chain 100 can be the most recent version of all of the versions 102 represented in the version chain (as is indicated by the "time" arrow shown in FIG. 1). The delta or patch version files 102 can be reverse delta files. Each of the reverse delta/patch files 102 can contain various instructions and data for how to recreate the original uncompressed version of corresponding to that particular reverse delta/patch file once all deltas that are more recent than that particular version have been also uncompressed. Version file 104 can be the oldest delta/patch file in the version chain 100, and version file 103 can be the most recent delta/patch file. Thus, in order to recreate the original uncompressed version of version file corresponding to delta/patch 104, all other version files from the head 101 backward must be serially decompressed. Similarly, to recreate version corresponding to delta/patch 105, all delta/patch files from the head 101 through the delta/patch 105 (inclusive of the head 101 and the delta/patch 105) must be serially decompressed.

In some instances, it may be necessary to add a new head to an existing reverse delta chain. Such addition can involve many sequential computational and disk input/output ("I/O") operations.

Figure 2:
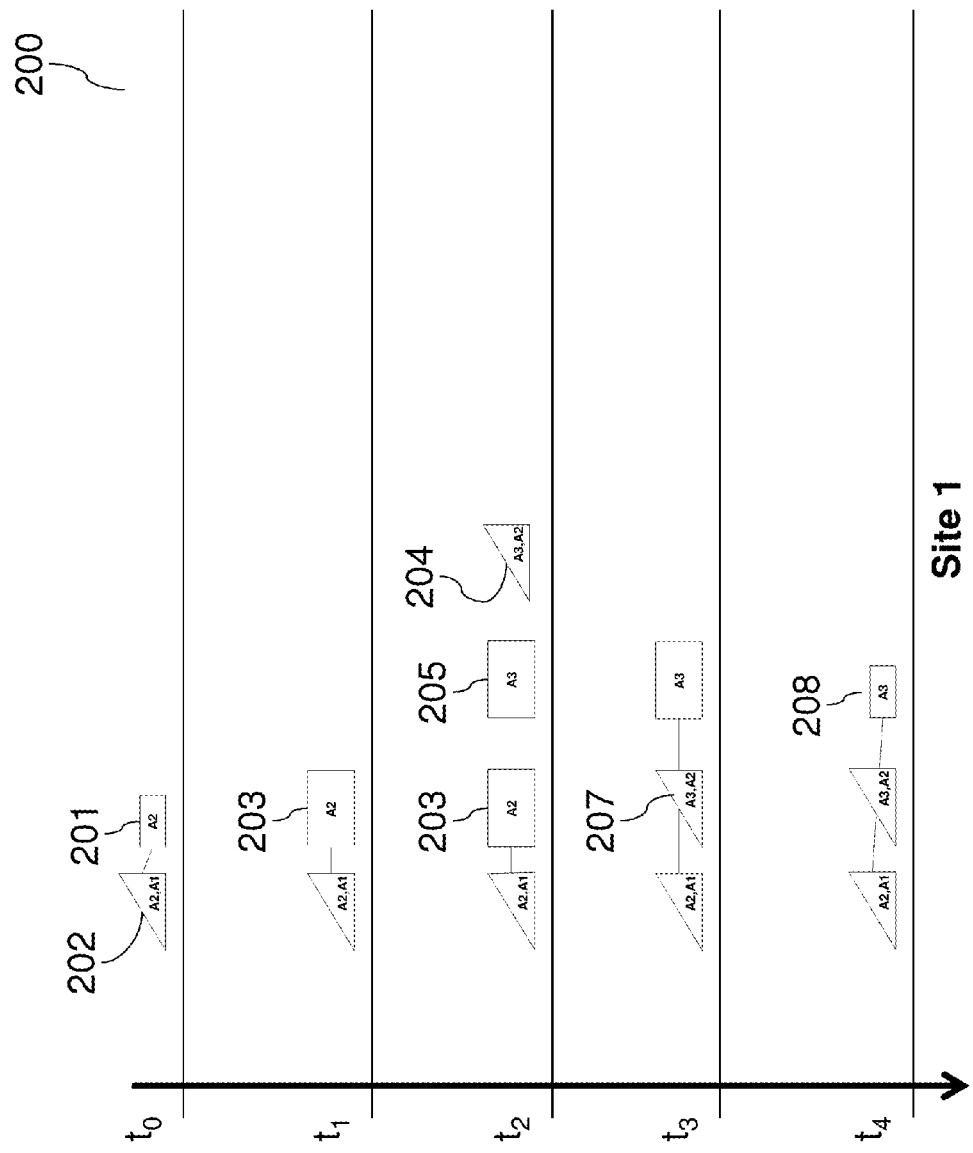
FIG. 2 illustrates an exemplary process for adding a new version to a reverse delta version chain for a single site system configuration.

FIG. 2 illustrates a sequence of operations 200 that can be performed for the purposes of adding a new version to an existing reverse delta version chain for a single-site system configuration. Prior to addition of a new head to the version chain, the chain can include a current version of a file "A2", corresponding to a head 201, and a single version 202 corresponding to a difference between an original version of the file "A1" and the current version of the file "A2". A new head 205 can be added, which can correspond to a new version of the file represented by the version chain. The addition of the new head 205 can take place over a plurality of time periods $t_0$-$t_4$, which can correspond to various states of the version chain shown in FIG. 2. These time periods can be as follows:

at time $t_0$: the existing version chain is shown including data compressed head 201 (which can be compressed using any known methods, such as, Lempel-Ziv), and a single delta-compressed reverse delta version file 202;

at time $t_1$: the existing head 201 is uncompressed, resulting in an uncompressed head 203 in the reverse delta version chain;

at time $t_2$: a reverse delta version file 204 is created based on the difference between the new version "A3" 205 and the previously most recent version "A2" 203;

at time $t_3$: a newly computed delta compressed version 207 is written to a disk and once that operation has succeeded, the previous head 203 is deleted;

at time $t_4$: the new head 205 is data compressed using data compression (e.g., Lempel-Ziv, and or any other data compression method), which becomes new head 208 after data compression.

In a two-site system configuration, addition of a new head to a reverse delta chain for can involve many sequential computational and disk I/O operations at both sites. A two-site configuration can include a primary site and a disaster recovery site that can store copies of data stored at the primary site.

Figure 3:
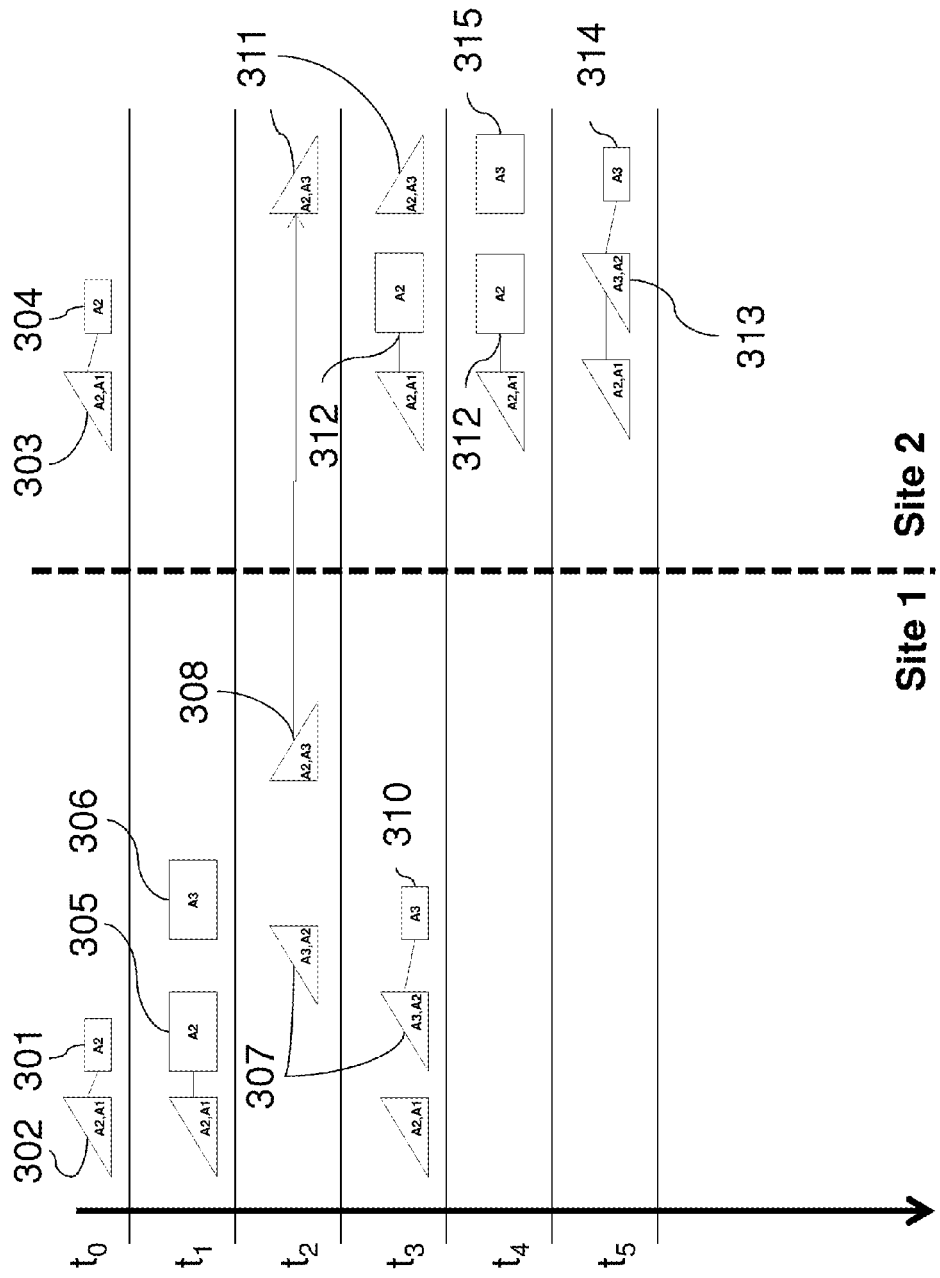
FIG. 3 illustrates an exemplary process for adding a new version to a reverse delta version chain for a two-site system configuration.

FIG. 3 illustrates a sequence of operations that can be performed to add a new version to an existing reverse delta version chain for a two-site system configuration, where the sites can be communicatively coupled via a communication network. Prior to adding a new head to the version chain, the chain, stored at site 1, can include a current version of a file "A2", corresponding to a head 301, and a single version 302 corresponding to a difference between an original version of the file "A1" and the current version of the file "A2". The chain, stored at site 2, can include a current version of a file "A2" 304 (which is the same as the head 301 stored at site 1), and single version 303 (which is the same as the version 302 stored at site 1). A new head 310 can be added, which can correspond to a new version of the file represented by the version chain. The addition of the new head 306 at both sites 1 and 2 can take place over a plurality of time periods $t_0$-$t_5$, which can correspond to various states of the version chain shown in FIG. 3. These time periods can be as follows:

at time $t_0$: sites 1 and 2 maintain the same version chain structure, as discussed above;

at time $t_1$: the existing head 301 at site 1 is uncompressed to produce a new uncompressed head 305 at site 1;

at time $t_2$: a reverse delta version file 307 and a forward delta version file 308, both representative of a difference between the new version of the file 306 and the current head 305, where the forward delta version 308 can be transmitted across a network from site 1 to site 2 to become a delta file 311 at site 2;

at time $t_3$: similar to FIG. 2, at site 1, the previous head 305 is deleted once the newly computed delta compressed version 307 is saved to disk storage and the new head 306 is data compressed (using any known data compression methods, e.g., Lempel Ziv), thereby becoming data-compressed head 310; whereby at site 2, the head 304 is uncompressed to become an uncompressed version file 312;

at time $t_4$: forward delta version 311, which has been sent from site 1 to site 2, is used as a delta patch file to update the previous head 312 with changes that need to be applied to it to create the most recent version "A3" 315;

at time $t_5$: a reverse delta version is computed based on the delta compression of versions 312 and 315, and once this new delta is written to disk storage, the previous head is deleted from disk storage; additionally, the new head 315 is data compressed (e.g., using any known data compression methods, e.g., Lempel Ziv) to create the new head 314.

2. Version Clusters

In some implementations, the current subject matter can replace reverse linear delta compressed version chains with more efficient version clusters.

Figure 4:
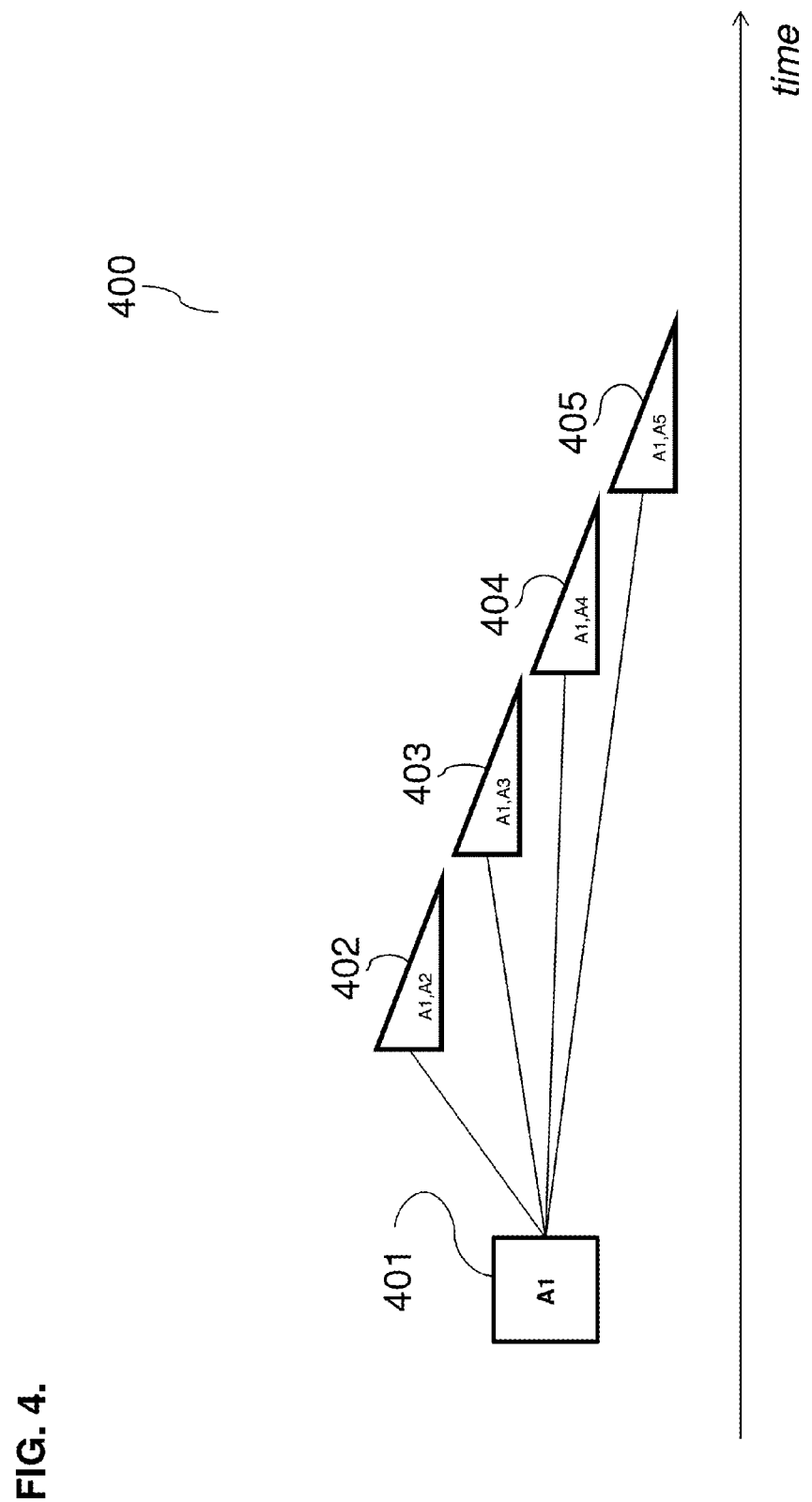
FIG. 4 illustrates an exemplary process for adding versions to an anchor version using version clustering, according to some implementations of the current subject matter.

FIG. 4 illustrates an exemplary version cluster 400 that can maintain an original version of the file and creates forward deltas over time from the original file, according to some implementations of the current subject matter. The version cluster 400 can include an original version of the file 401 and forward deltas 402-405. The original version of the file 401 can also be referred to as an anchor of a cluster. As can be understood, any version in the cluster can be selected as an anchor of the cluster, i.e., it is not necessary to have the original version be the anchor of the cluster. As shown in FIG. 4, the forward delta 402 can represent differences between the original version of the file "A1" and new version "A2"; the forward delta 403 can represent differences between the original version of the file "A1" and new version "A3"; the forward delta 403 can represent differences between the original version of the file "A1" and new version "A3"; the forward delta 404 can represent differences between the original version of the file "A1" and new version "A4"; and the forward delta 405 can represent differences between the original version of the file "A1" and new version "A5".

In some implementations, the current subject matter can replace reverse delta version chains shown in FIGS. 1-3 with version clusters 400. Such replacement can allow have at least one or more of the following advantages:

faster updates to version chains on the ingestion of every new backup stream (which is one of the most common operations in a deduplication processor);

more predictable and faster decompression rates for older versions;

simplified file purging/deletion since there are fewer serial delta version dependencies;

faster and more predictable restore times for all but the most recent versions;

enabling of SSD caching for deduplication appliances; and enabling of the utilization of simple storage services (e.g., Amazon S3, and/or any other services) as a disaster recovery site.

In some implementations, the current subject matter can include a re-anchoring process that can be employed to minimize consumed disk storage capacity and inter-site network bandwidth. Adding new delta versions to an existing group of delta versions is most frequent and time-consuming operation performed in a backup deduplication environment. As shown and discussed in connection with FIGS. 2 and 3, there are many serial computational and disk I/O transfer steps involved with adding new versions to existing reverse delta linear version chains.

Figure 5:
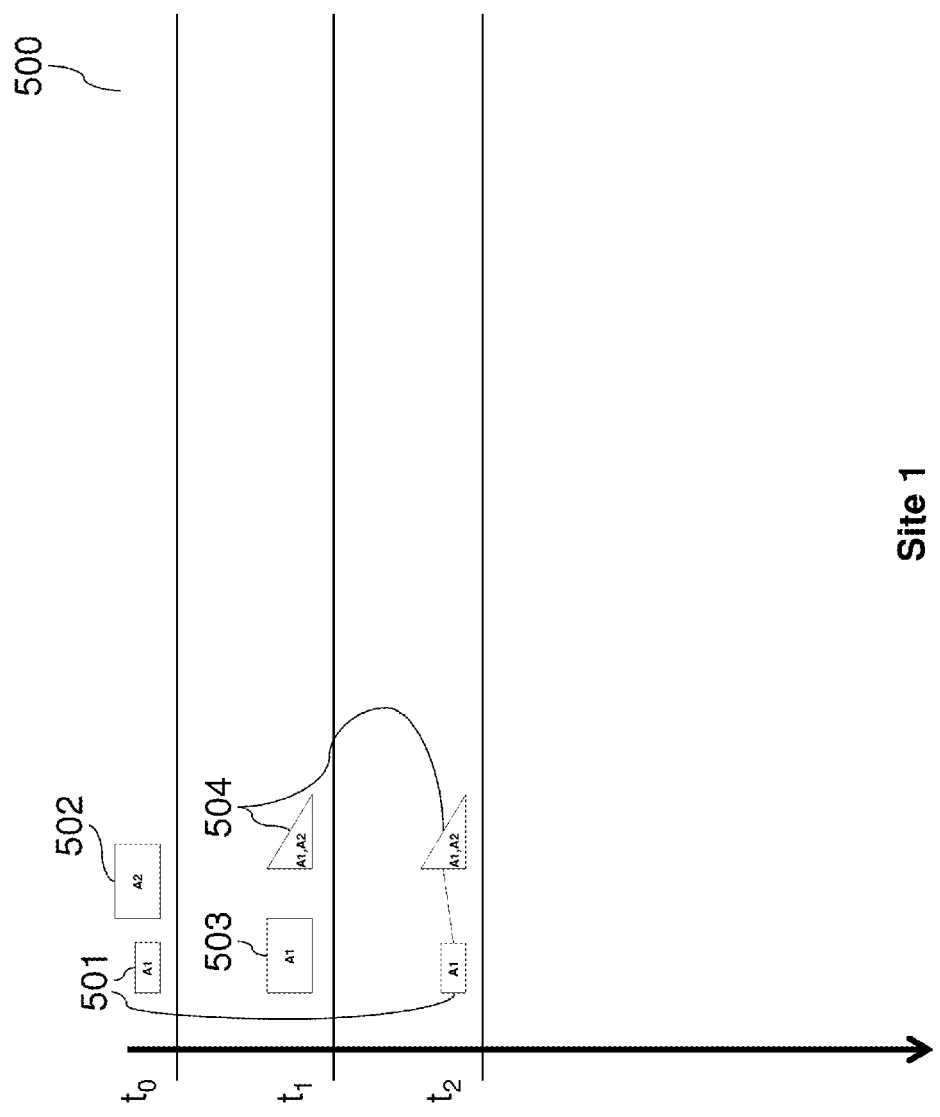
FIG. 5 illustrates an exemplary process for adding a new first version to a version cluster for a single site system configuration, according to some implementations of the current subject matter.

FIG. 5 illustrates an exemplary sequence 500 of operations for adding a new version to an existing version cluster in a single site configuration, according to some implementations of the current subject matter. As shown in FIG. 5, the current version of a file is a data compressed anchor "A1" 501 of a cluster. The cluster shown in FIG. 5 can include other versions (which are not shown in FIG. 5). A new version "A2" 502 can be added to the cluster that is currently anchored by the version 501. The addition of the new version 502 can take place over a plurality of time periods $t_0$-$t_2$, which can correspond to various states of the cluster. These time periods can be as follows:

at time $t_0$: an existing cluster can include data compressed anchor 501 (which can be compressed using any known methods, such as, Lempel-Ziv); a new version 502 can be provided for addition to the version cluster anchored by the anchor 501;

at time $t_1$: the original anchor 501 of the file can be data decompressed to create an uncompressed version "A1" or uncompressed anchor 503 in memory and, using delta-compression, a forward delta patch file 504 can be temporarily generated (while keeping the original version) from the uncompressed anchor 503 and the version 502 (representative of the differences between the uncompressed anchor 503 and the version 502); and at time $t_2$: new delta patch file 504 can be associated with the saved compressed anchor file 501 as a forward delta version (by data compressing the uncompressed anchor 503).

Figure 6:
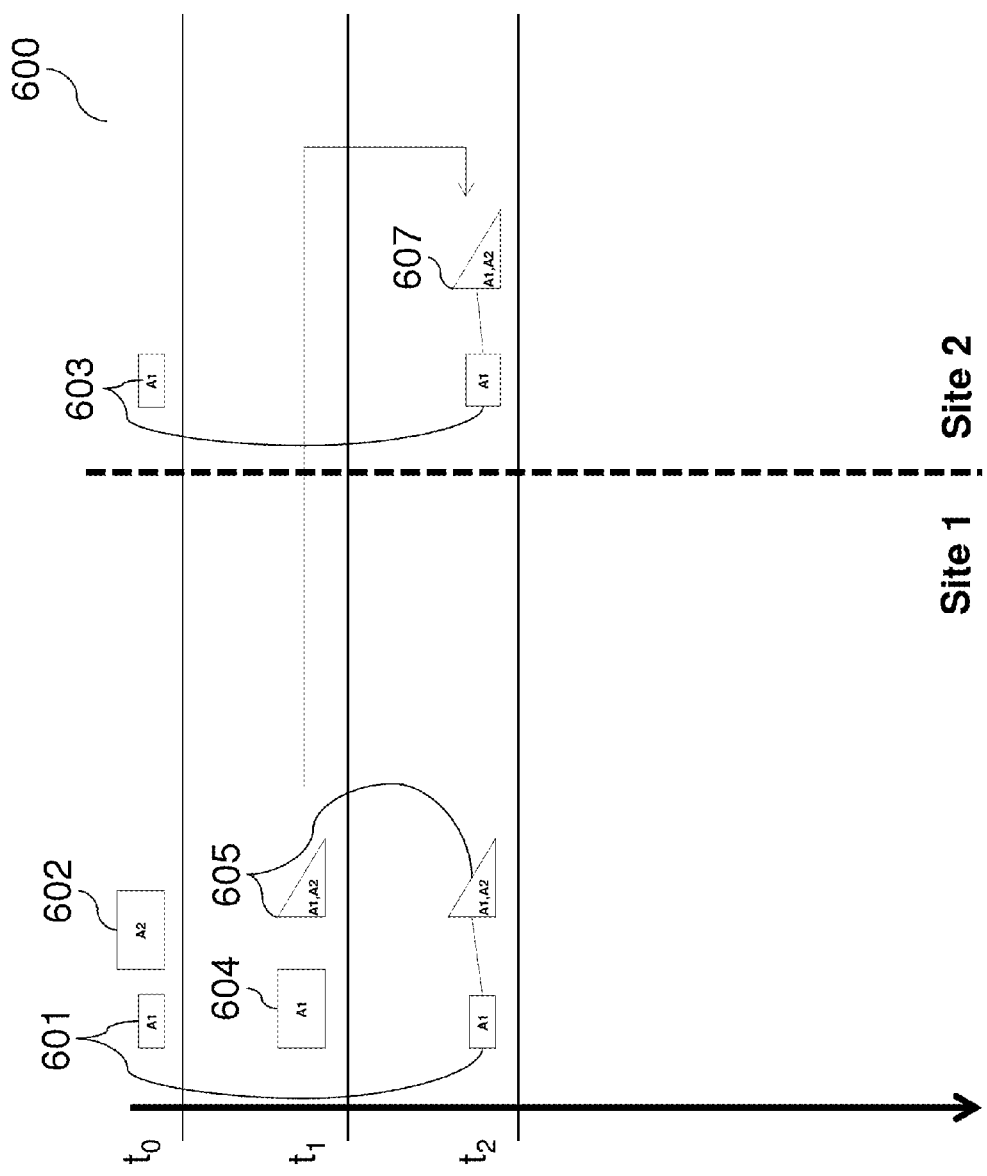
FIG. 6 illustrates an exemplary process for adding a new first version to a version cluster for a two-site system configuration, according to some implementations of the current subject matter.

FIG. 6 illustrates an exemplary process of managing version clusters in a two-site configuration, according to some implementations of the current subject matter. As shown in FIG. 6, the current version of a file is a data compressed anchor or head "A1" 601 of a cluster that is stored at site 1. At site 2, the same version of the file is stored as a data compressed anchor or head "A1" 603. A new version "A2" 602 can be added to the cluster anchored by the version 601 at site 1. The addition of the new version 602 to site 1 and site 2 can take place over a plurality of time periods $t_0$-$t_2$, which can correspond to various states of the clusters at site 1 and site 2. These time periods can be as follows:

at time $t_0$: at site 1, an existing version chain includes a data compressed head 601 (which can be compressed using any known methods, such as, Lempel-Ziv), and a new version 602 can be prepared for addition to the version cluster; at site 2, a corresponding data compressed head "A1" 603 can be stored;

at time $t_1$: at site 1, the original version 601 of the file can be data decompressed to create a uncompressed version of the file or anchor 604 in memory and, using delta-compression, a forward delta patch file 605 can be generated from the uncompressed anchor 604 and the version 602 (representative of the differences between the uncompressed anchor 604 and the version 602); a copy of the new forward delta patch file 605 file can be transmitted to site 2, and stored as forward delta patch file 607; at site 1, the new version 602 can be deleted;

at time $t_2$: at site 1, the new delta patch file 605 can be associated with the saved compressed anchor 601, whereby the uncompressed anchor 604 can be deleted; at site 2, the new delta patch file 607 can be associated with the compressed anchor 603.

As discussed above and shown in FIGS. 2-6, in comparing the number of operations performed in single site (FIG. 2 and FIG. 5) and two-site (FIG. 3 and FIG. 6) configurations, the number of discrete computational and disk I/O operations for managing versions using version clustering is far less than those using conventional reverse linear delta version chains. In comparing the performance of version cluster processing to reverse linear delta version chain processing, version clustering can achieve a significant improvement in (e.g., a greater than twice) performance as compared to conventional reverse linear delta version chain processing for both single site and two-site configurations.

3. Delta-Drift and Re-Anchoring

In some implementations, the current subject matter's version clustering system and method can achieve significant performance benefits in addition to addressing delta-drift issues of conventional systems. In conventional linear version chains, the delta files that are adjacent to each other reflect just the changes from one version to the next and hence, delta drifting might not be an issue. With version clustering, delta files can potentially grow larger and larger as each successive delta is computed against the original anchor file. In some implementations, the current subject matter mitigates the impact of delta drift through a re-anchoring process, as discussed below.

In some implementations, a variety of options for determining when the re-anchoring operation can occur exist, as illustrated below:

size-based re-anchoring: examine the size of the most recent version delta zone and determine whether to re-anchor based on the size of that delta as compared to its original file size;

periodic re-anchoring based on version count: once M version deltas have been associated with an anchor, a re-anchoring operation can be performed;

periodic re-anchoring based on every "N" hours/days (or other time periods):

once every N hours/days (or other time periods) have passed since a prior re-anchoring operation occurred, another re-anchoring operation can be performed;

re-anchoring based on a zone stamp edit distance: an edit distance of the zone stamps can be used as a similarity measure to determine when to re-anchor. An exemplary zone stamp is discussed in a co-pending, co-owned U.S. patent application Ser. No. 12/455,281, filed Mar. 29, 2009, the disclosure of which is incorporated herein by reference in its entirety. For each zone, a short zone stamp can be created. When zone stamps of a pair of zones are compared, the similarity of the zone stamps can reflect the similarity of the zones themselves. A pair of zones whose zone respective stamps exceed a threshold of their edit distance can indicate significant file differences, thus, a re-anchoring operation can be performed.

Re-anchoring can be a computational and disk I/O intensive process. For this reason, the workload of re-anchoring large collections of version clusters can be distributed over time to minimize the impact of heavy re-anchoring processing on the rest of the deduplication processor operations that must also be completed in a timely manner.

Figure 7:
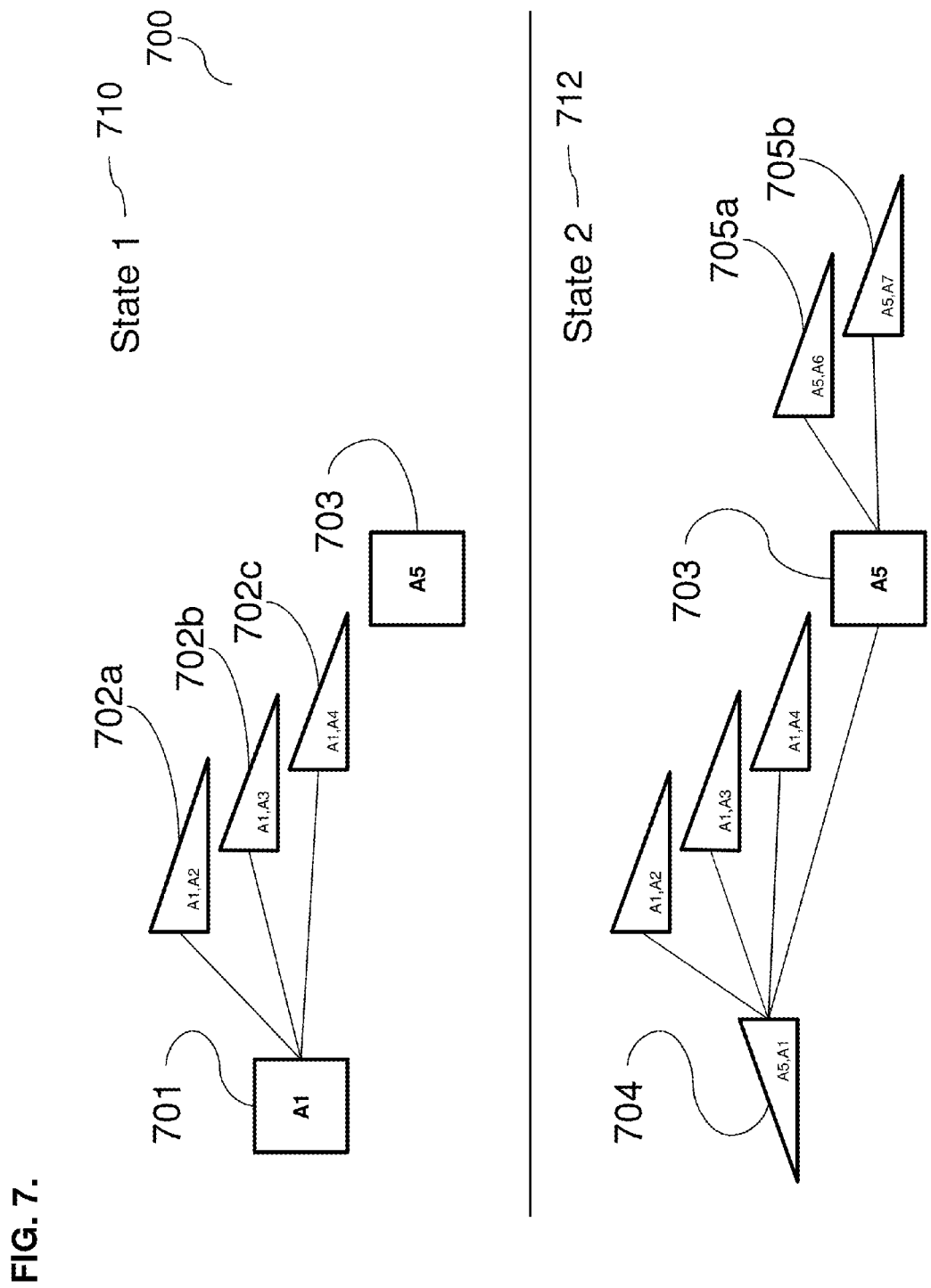
FIG. 7 illustrates an exemplary re-anchoring process to accommodate delta drift, according to some implementations of the current subject matter.

FIG. 7 illustrates an exemplary system 700 for performing a re-anchoring process, according to some implementations of the current subject matter. The system 700 is shown as having two exemplary states 1 (as 710) and 2 (as 712). At state 1 710, the anchor "A1" 701 can be associated with three forward delta versions 702a, 702b, and 702c, which can be representative of three different versions "A2", "A3", and "A4", respectively. The forward delta version 702a can contain differences between the anchor 701 and version "A2"; forward delta version 702b can contain differences between the anchor 701 and version "A3"; forward delta version 702c can contain differences between the anchor 701 and version "A4". The cluster anchored by the anchor "A1" can include more forward delta versions 702.

Using any of the above re-anchoring methodologies, it can be determined that a new zone "A5" 703 should become a new anchor of the cluster shown in FIG. 7, to which all future versions will be attached. Results of the re-anchoring process are shown at state 2 712. To re-anchor the cluster to the new version 703, a reverse delta version 704 can be computed. The reverse delta version 704 can represent a difference between the new version "A5" 703 and the original anchor "A1" 701. The original forward delta versions 702a, 702b, and 702c can remain attached to newly computed reverse delta version 704, as the reverse delta version 704 can represent the differences between the new anchor "A5" 703 and the original anchor "A1" 701, whereas the forward delta versions 702 (a, b, c) represent differences between the original anchor "A1" and versions "A2", "A3", and "A4", respectively. All future delta versions 705a, 705b, representative of the differences between the new anchor "A5" 703 and versions "A6" and "A7", respectively, can be delta-compressed against the new anchor "A5" 703. Thus, the future delta versions 705a and 705b will be forward delta-compressed versions based on the new anchor "A5" 703.

4. Purge/Deletion

In some instances, to maintain version chains that are retained over months or years, various data, including obsolete data, may need to be purged from version chains and/or clusters. Typically, the oldest version within the chain and/or cluster can be requested to be deleted/purged first, however, any version can be requested to be deleted/purged.

Referring back to FIG. 1, in reverse delta linear chains (such as the linear chain 100), the oldest version 104 can be deleted without affecting other versions since no other version in the linear chain 100 depends on it. However, if it is desired to delete/purge any other version in the chain 100 that is not the oldest version, e.g., delta-compressed version 105, deletion/purge of such version can be more time consuming and complicated.

Thus, in order to delete/purge a file associated with delta-compressed version 105, a series of pairwise delta decompression operations are executed from the head 101 of the chain 100 backward up to the delta-compressed version 105. Then, once the intermediate versions and the delta-compressed version 105 have been delta-decompressed, the file associated with the delta-compressed version 105 can be deleted/purged. Subsequent to the deletion of the file associated with version 105, the versions between the head 101 and what used to version 105, are re-delta compressed forward to the head again. This means that all such versions have to be recomputed as the version 105 no longer exists.

This creates a significant amount of computational and disk I/O loads on the deduplication processor. Exemplary reverse delta version chain deletion/purging acceleration techniques are discussed in a co-pending, co-owned, U.S. patent application Ser. No. 13/434,306, filed Mar. 29, 2012, the disclosure of which is incorporated herein by reference in its entirety.

Referring to FIG. 7, deletion/purging of forward delta versions in a version cluster (702*a*, 702*b*, 702*c*, 705*a*, and 705*b*) from the version cluster 700 can be a straightforward operation, because no other delta are dependent on the forward delta versions. If forward delta versions 705*a* and 705*b* have been previously deleted/purged, and a request to delete/purge the anchor 703 is received, the anchor 703 cannot be deleted/purged because the reverse delta version 704 is dependent on it. However, the reverse delta version 704 can be deleted/purged, upon request, if all forward delta versions 702*a*, 702*b*, 702*c* that depend on the reverse delta version 704 have already been deleted/purged. In order to purge/delete the anchor 703, the reverse delta version 704 can assume the role of a new anchor of the cluster 700 and can become the anchor 701 again (as shown in State 1 710 in FIG. 7).

A timing of the deletion/purging of the anchor 703 and/or the reverse delta version 704 (which can have forward delta versions dependent on them) can be based on at least one of the following exemplary models (or any combination thereof or any other models):

deferred purging: an anchor or reverse delta versions that still has forward delta dependencies can be marked for future deletion/purging, and can be deleted/purged as soon as its last dependent forward delta version has been deleted/purged;

immediate purging: an anchor and/or reverse delta version that still has forward delta versions dependent on them can be deleted/purged once a new "anchor" is generated from an existing forward delta version in the cluster and all other forward deltas that were dependent on the existing anchor and/or reverse delta version are recomputed and delta compressed against the newly generated anchor.

Figure 8:
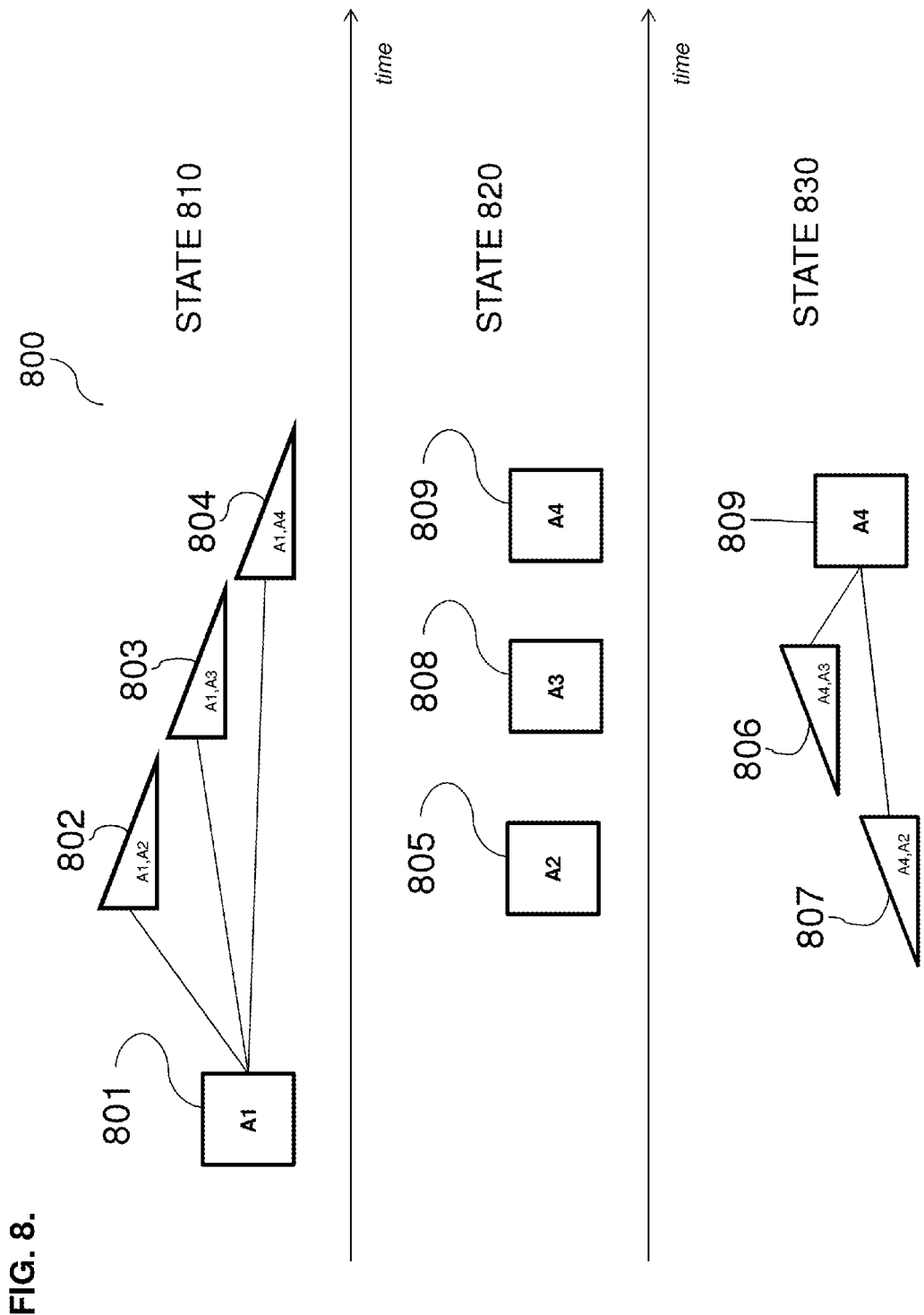
FIG. 8 illustrates an exemplary process of purging an anchor, according to some implementations of the current subject matter.

FIG. 8 illustrates an exemplary deletion/purging of an anchor "A1" 801 from the cluster 800, according to some implementations of the current subject matter. To initiate deletion/purging of the anchor A1 801, a delete/purge request can be received by a system where the cluster 800 can be stored. As shown in FIG. 8, the anchor A1 can have three forward delta-compressed versions 802, 803, and 804 that are dependent on it. As shown by the state 810 of the cluster 800, the delta-compressed version 802 can represent differences between the anchor A1, which is a version of a file, and a version A2 802 of the same file. The delta-compressed version 803 can represent differences between the anchor A1 and a version A3 of the file. The delta-compressed version 804 can represent differences between the anchor A1 and a version A3 804 of the file.

In order to purge anchor A1 801, the current subject matter system can create a new anchor using one of the forward delta-compressed versions 802, 803, and 804 that are not requested to be deleted/purged. In order to create a new anchor, the forward delta-compressed versions 802, 803, and 804 can be delta-decompressed to generate full file version A2 805, version A3 808, and version A4 809, respectively, as shown by the state 820 of the cluster 800. In some implementations, the version A4 can be the most recent version and can be selected as the new anchor (other versions can be selected as a new anchor). Upon selection of the new anchor A4, the remaining versions 805 and 808 can be replaced by reverse delta-compressed versions 807 and 806, respectively, as shown by the state 830 of the cluster 800. The reverse delta compressed version 807 can be computed using delta compression of uncompressed version 809 and uncompressed version 805 to represent differences between the versions 805 and 809. Likewise, the reverse delta-compressed version 806 can be computed using delta compression of uncompressed version 808 and uncompressed version 809 to represent differences between the versions 808 and 809. Then, the original anchor 801 can be deleted/purged. This immediate purging model may be required in situations that require timely and secure purging of specific files based on regulatory rules, for example.

5. Read Version Methods

One of the potential side effects in replacing reverse linear delta versions chains with version clusters can be the time that it takes to access the most recent version within the group of versions. Using reverse linear delta version chains, the operation can be simple. For example, as shown in FIG. 2, only the head 201 of the version chain can be uncompressed to create the original file 203. Referring to FIG. 5, with version clusters, the anchor 501 must be uncompressed, and then the delta patch file that represents the most recent version 504 has to be delta decompressed against the uncompressed anchor.

Figure 9:
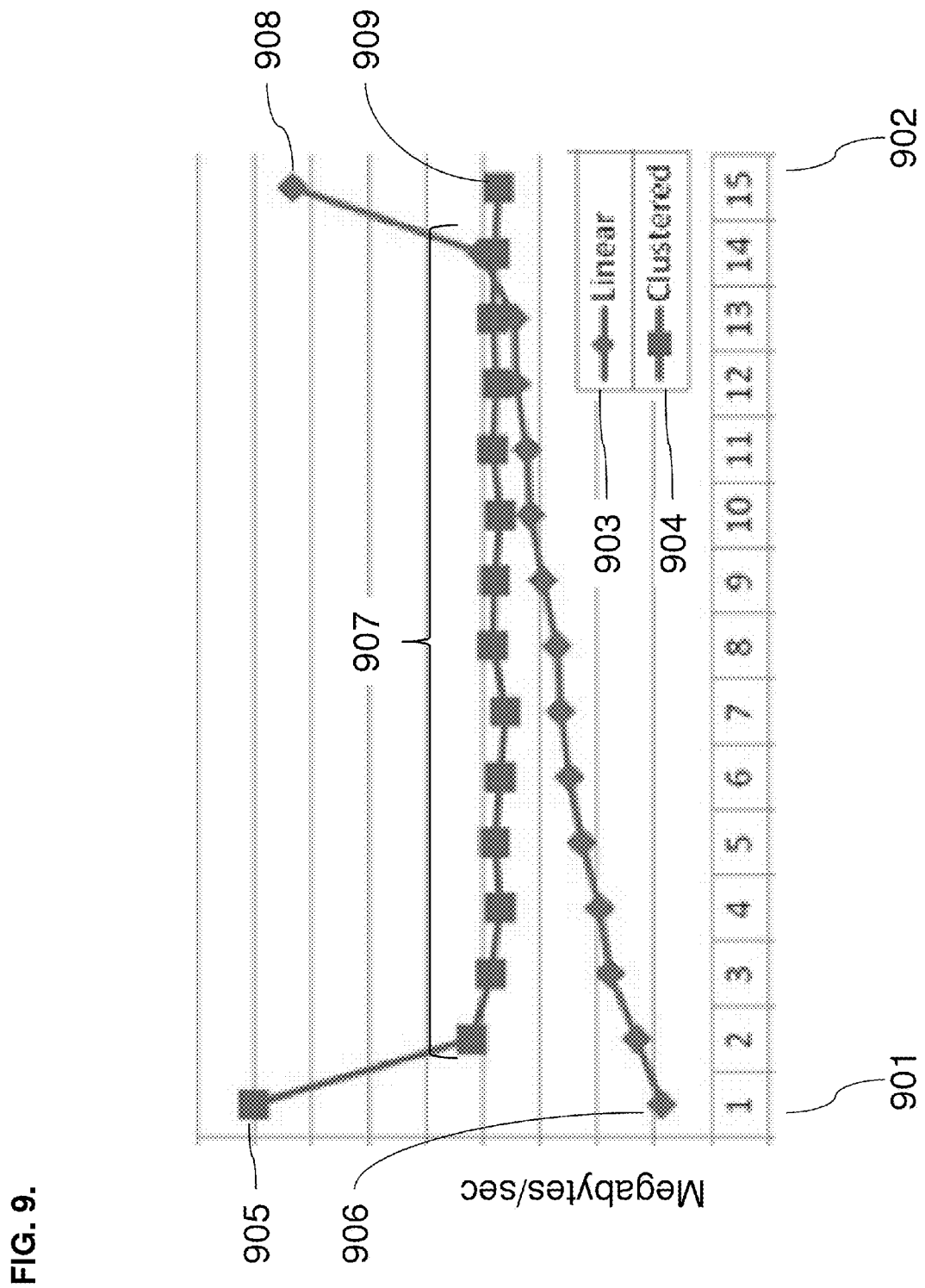
FIG. 9 illustrates an exemplary plot showing relative restore performance by using linear reverse delta chains versus using a version cluster, according to some implementations of the current subject matter.

FIG. 9 illustrates an exemplary plot showing a comparison of performances measured in megabytes-per-second for accessing various versions for reverse linear delta version chains 903 and version clusters 904. The performance data is illustrated for reverse linear delta version chains and version clusters each containing fifteen versions. The performances for accessing each of fifteen versions for both are shown in plots of FIG. 9. The reverse linear delta version chain 903 can include the oldest version 901 and the most recent version 902, as shown in FIG. 9. The version cluster 904 can include the oldest version 905 and the most recent version 908. In comparing performances of reading various versions from reverse linear delta version chains and the version clusters, the following can be observed (based on an experimental data observed during an exemplary implementation of the current subject matter system):

Reading the oldest version, which can be the anchor 905 of the version cluster 904, is 28% faster than reading the oldest version 906 from a reverse delta version chain (as indicated by the falling curve 903 corresponding to the linear reverse delta version chain). Reading the oldest version from the reverse delta version chain 903 can require that all versions prior to it are delta decompressed, thereby explaining performance differences between the reverse linear delta versions and the version cluster.

For all intermediate versions 907 that are part of a version cluster, accessing a version using version clustering is almost always faster than accessing a version from the reverse linear delta version chain, since with version clustering. Accessing any intermediate version involves only the delta decompression of a single version against a common compressed anchor. For all intermediate versions 907 that are part of a reverse linear delta version chain, it can take longer to restore older files because each version to the right of the version to be accessed must be serially delta decompressed, involving a significant amount of computation and disk I/O activity.

With reverse linear delta version chains, reading the most recent version 908 was 15% faster than reading the most recent version 909 from a version cluster. The moderate loss of performance for accessing the most recent file from a version cluster is heavily outweighed by the greater performance gains of adding versions to an existing version cluster, an operation that is performed much more frequently and for extended periods (e.g., hours) of time.

6. Version Cluster Anchor Redundancy

One of the challenges of delta version management is the inter-relationship among versions of files, and a potential for greater loss of data than storing the files independently, when one or more of the inter-related deltas is found to be unrecoverable. This can occur over time from disk drive errors, RAID controller errors, file system software errors, operating system errors, etc.

In case of reverse linear delta chains, any failed delta version in the linear chain renders all earlier deltas unrecoverable. If the most recent version, i.e., the head of the chain (version 101, as shown in FIG. 1), is found to be unrecoverable, all of the versions (e.g., version 102, as shown in FIG. 1) of that reverse delta chain will be unrecoverable.

In some implementations, the current subject matter's system that implements version clusters can improve overall reliability of versions as compared to the reverse linear delta version chains. As shown in FIG. 7, with version clustering, any single forward delta version (e.g., versions 702*a*, 702*b*, 702*c*, 705*a*, 705*b*) that can be found to be unrecoverable does not affect the readability and/or recoverability of any other version in the cluster. If a reverse delta version (e.g., version 704), formed by the re-anchoring process, is found to be unrecoverable, the recoverability of other versions is unaffected and the "damage" of that reverse delta version can be contained to that version and the forward versions that are dependent on it.

If an anchor of a version cluster (i.e., cluster 703) is found to be unrecoverable, then un-recoverability of the cluster anchor can affect all versions that are dependent on the cluster anchor, which is similar to losing the head of a reverse linear delta version chain—all versions that are dependent on it are unrecoverable as well. One of the main differences between the head of a conventional reverse linear delta version chain and the current subject matter's anchor of a version cluster is a stability of the anchor over time in the version cluster as compared with the constantly changing head of the reverse linear delta version chain (i.e., every time a new version is added to the linear chain, the head of the chain changes). The cluster anchor is not affected by the addition of new versions, as the versions are computed based on the cluster anchor. Further, the current subject matter system can increase redundancy for the subset of all of the anchors of version clusters that have the potential for causing significant data loss if they are determined to be unrecoverable. With reverse linear delta version chains, there is an appreciable amount of additional computation and disk I/O operations involved in creating the same kind of redundancy each time a new version is added.

In some implementations, a number of policies that can be selected and/or used to ascertain which version clusters receive anchor redundancy:

Capacity-based policy—version clusters that represent the greatest total amount of uncompressed data, as a percentage of total storage capacity consumed, can be used in determining whether a version cluster should receive anchor redundancy.

Dependency count-based policy—version clusters, where a count of dependent forward delta versions is greatest, can be used in determining whether a version cluster should receive anchor redundancy. The count can be a fixed value, or a value selected automatically, manually by an administrator of the deduplication processor, and/or in any other fashion. The policy can be based on providing additional redundancy for the top N-percentage of version clusters with a highest number of dependent forward delta versions.

Temporal-based policy—version clusters, having the greatest amount of versions added over a predetermined period of time (e.g., periodically, such as hourly, daily, weekly, etc., during a specified period of time, and/or any other predetermined time period, such as, clusters that have grown the most over the last week), can be used in determining whether a version cluster should receive anchor redundancy.

Logical-grouping-based policy—all version clusters, which are related to a particular grouping on the deduplication processor, can be used in determining whether a version cluster should receive anchor redundancy. For example, the deduplication processor could represent a Network Attached Storage ("NAS") apparatus, with multiple logical "shares". All of the version cluster anchors of one share might be replicated, where the anchors associated with another share might not be replicated.

In some implementations, the current subject matter system can provide various methods for increasing an availability of an anchor of a version cluster. To increase availability, an anchor can be replicated and/or mirrored, which can consume twice the anchor storage capacity. A shown in FIG. 12, a first anchor "A1*a*" 1201 can be replicated as an exact duplicate "A1*b*" 1202 of anchor 1201. To prevent from duplicating an already corrupted first anchor 1201, first anchor 1201 can be check-summed, and prior to anchor replication, the first anchor checksum can be recomputed and compared with the stored checksum. Anchor replication can take place when the recomputed checksum of the first anchor matches its stored checksum. The redundant anchor can then be associated with all of the dependent forward delta versions as the original anchor (i.e., versions "A1, A2", "A1, A3" and "A1, A4", as shown in FIG. 12, and which can represent differences between A1 and a respective version).

To minimize redundant anchor storage capacity, the anchor file can be split and encoded into a RAID4/5/6 data group format and/or encoded with an erasure code to provide recovery from the loss of any M of N segments of the anchor file (where M and N are integers and M≤N). An encoded redundant anchor can consume less capacity (e.g., 10% to approximately 30% of the first anchor file size), than the 100% increase in consumed storage capacity of replicated anchors.

Figure 12:
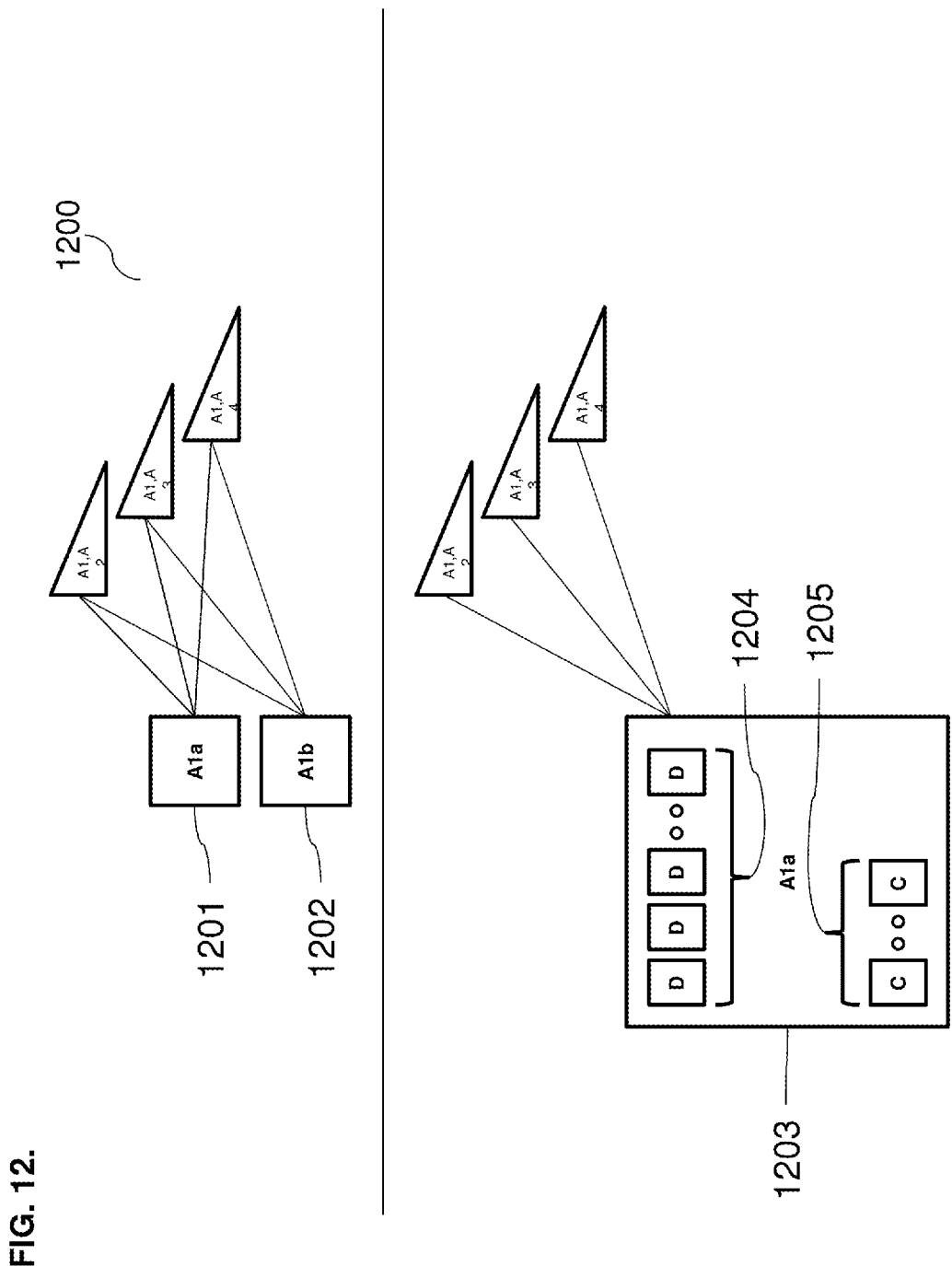
FIG. 12 illustrates exemplary two anchor redundancy implementations, according to some implementations of the current subject matter.

As shown in FIG. 12, the first anchor file 1201 can be verified to be uncorrupted via its stored checksum. Next, it can be split into a number of "data" segments 1204. From these data segments, one or more check segments 1205 can be computed in order to recover from any one or more corrupted data or check segments, depending on the encoding type selected. The resulting data and check segments can be stored separately as individual files, but can be logically aggregated into the representation of a more highly available anchor 1203. This logical redundant anchor can replace anchor 1201 by being associated with all of the dependent forward versions. The original first anchor 1201 can then be deleted along with its associations to all of its forward delta chains.

In some implementations, the redundant anchors can be eliminated when the organization of a version cluster changes over time. For example, purge and/or delete operations and/or a change to the anchor redundancy policy can cause a number of redundant anchors to be reduced to single anchors once again.

In addition to overall general performance improvements in versioned data management, the version cluster structure enables the use of solid-state disk as a caching accelerator for additional performance improvements.

Figure 10:
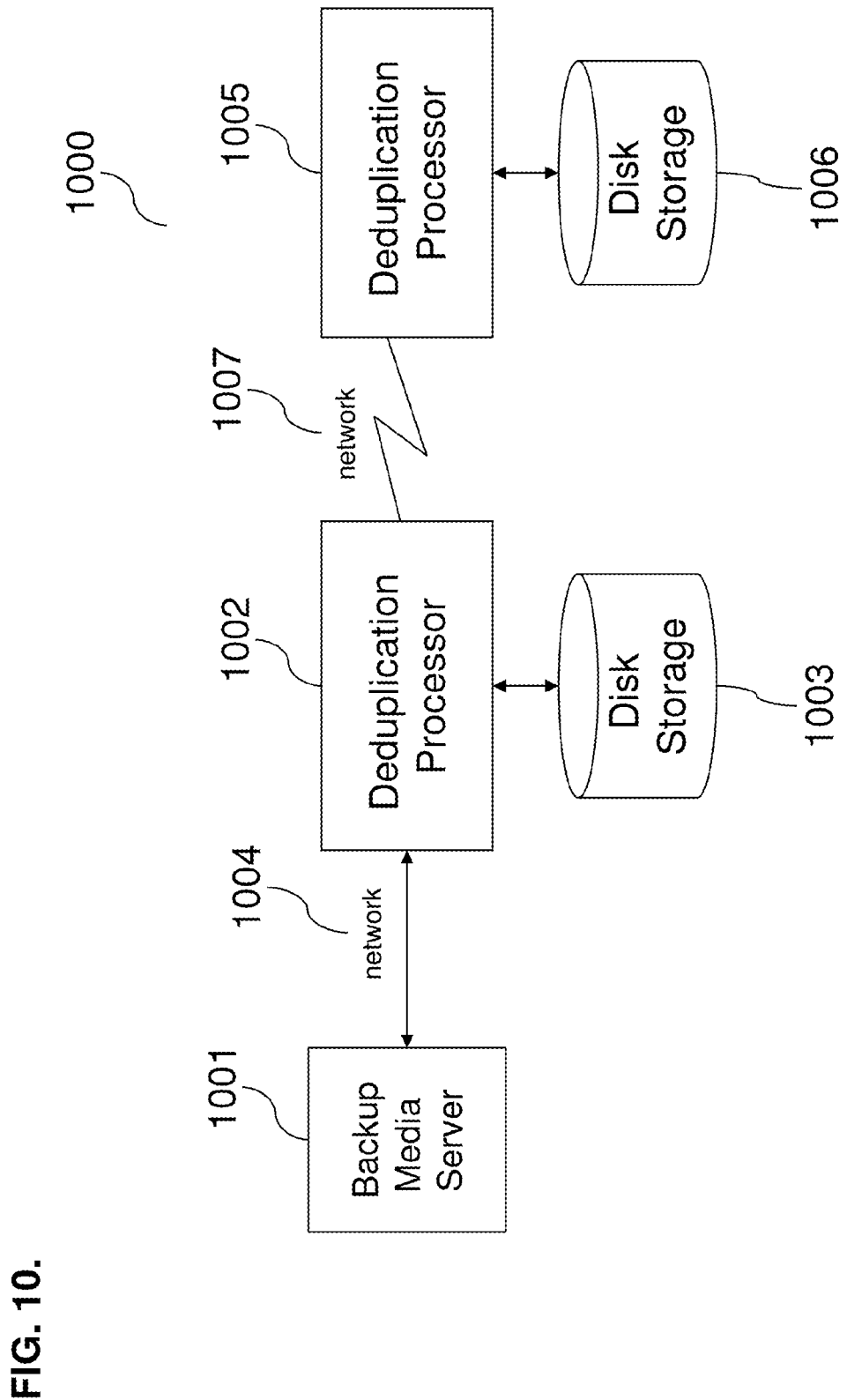
FIG. 10 illustrates an exemplary two-site configuration for performing deduplication and storage at two sites, according to some implementations of the current subject matter.

FIG. 10 illustrates exemplary systems associated with the application of the current subject matter. On a periodic basis (daily, weekly, monthly), a backup server 1001 streams large amounts of backup data across a local area network 1004 into a local deduplication processor 1002, where deduplicated data in the structure of millions of version clusters is stored on the local disk storage 1003 apparatus, according to some implementations of the current subject matter. This deduplication processor performs the operation of splitting the backup stream into zones, identifying similar zones, delta compressing similar zones and organizing these related zones into version clusters. An exemplary deduplication mechanism is discussed in co-pending, co-owned, U.S. patent application Ser. No. 12/455,281, filed Mar. 29, 2009, the disclosure of which is incorporated herein by reference in its entirety.

In order to survive a primary site disaster, an optional deduplication processor 1005 and its associated disk storage 1006 apparatus may be located and operated at a geographically remote facility. The deduplication processor 1002 (FIG. 10) spends the majority of the time adding new versions to version clusters. This operation is both a computationally intensive and a disk I/O intensive process.

7. Cloud Storage Enablement

In addition to overall general performance improvements in versioned data management, the version cluster structure can enable use of cloud storage services (e.g., Amazon S3, and/or any other cloud-type storage devices) that can act as a disaster recovery site for a primary site data. Such cloud storage enablement can be useful as conventional reverse linear delta version chains represent an unsuitable structure for managing versions of data in cloud storage. This is because the head of each chain is constantly being replaced and/or updated. This can increase cost of monetary data transfer service charges, require computation capability in the cloud to perform deduplication, and can be further impossible to realize with the very limited network bandwidth of these cloud storage services.

FIG. 10 illustrates a typical two-site deployment system 1000 for storage of data. The apparatus 1000 can include a backup media server 1001, a deduplication processor 1002 communicating with a disk storage 1003, another deduplication processor 1005 communicating with a disk storage 1006. The backup media server 1001 can communicate with the deduplication processor 1002 via a network 1004, which can be any suitable network (e.g., wireless, wired, LAN, WAN, MAN, etc.). The deduplication processor 1002 can communicate with the deduplication processor 1005 via network 1007, which can also be any suitable network (e.g., wireless, wired, LAN, WAN, MAN, etc.).

The deduplication processor 1002 and the disk storage 1003 can be located at a primary site, whereas the deduplication processor 1005 and the disk storage 1006 can be disposed at a second site, which can, for example, serve as a disaster recovery site. The deduplication processor 1005 can include a processor that can perform compression, decompression, delta compression, and/or delta decompression operations on data that can be received from the primary site deduplication processor 1002. This processing capability can be used for management of reverse linear delta version chains at the second site, which might not be required for managing of version clusters. The second site can also maintain a traditional database that stores all of the metadata that can be required to link backup application catalog versions to tapefiles and tapefiles to zones.

Figure 11A:
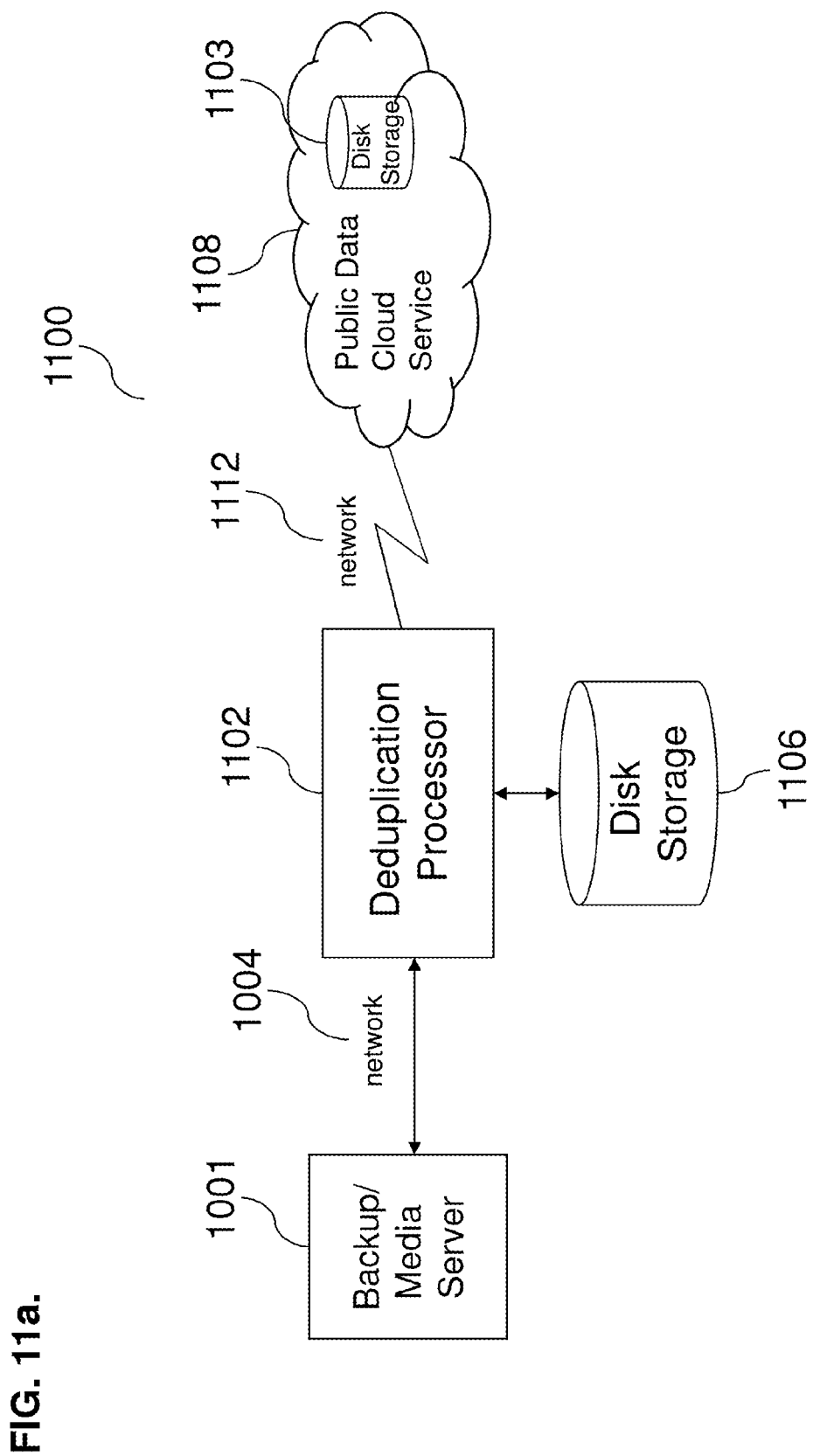
FIG. 11a illustrates an exemplary public data cloud service and disk storage being used as a second site, according to some implementations of the current subject matter.

FIG. 11a illustrates an exemplary two site system 1100 for storage of data, where one site includes a public cloud data serve, according to some implementations of the current subject matter. The system 1100 can include the backup media 1001 (similar to the one shown in FIG. 10), a deduplication processor 1102 communicating with a disk storage 1106, and a public data cloud serve 1108, which includes a disk storage 1103, that can communicate with the deduplication processor 1102 via a network 1112.

The public cloud data service 1108 can be used as a second site and/or disaster recovery site, according to some implementations of the current subject matter. The public cloud service 1108 can provide an object storage model and can allow files to be written (e.g., "PUT"), read (e.g., "GET") and/or deleted (e.g., "DELETE") from disk storage 1103. The system 1100 can be configured to perform various computational tasks, such as those shown in FIG. 3. However, in some implementations, such as the one shown in FIG. 11a, the version cluster structure can eliminate all second-site computation by allowing new anchors and version deltas to be written (e.g., "PUT") to the public cloud service's disk storage 1103.

Figure 11B:
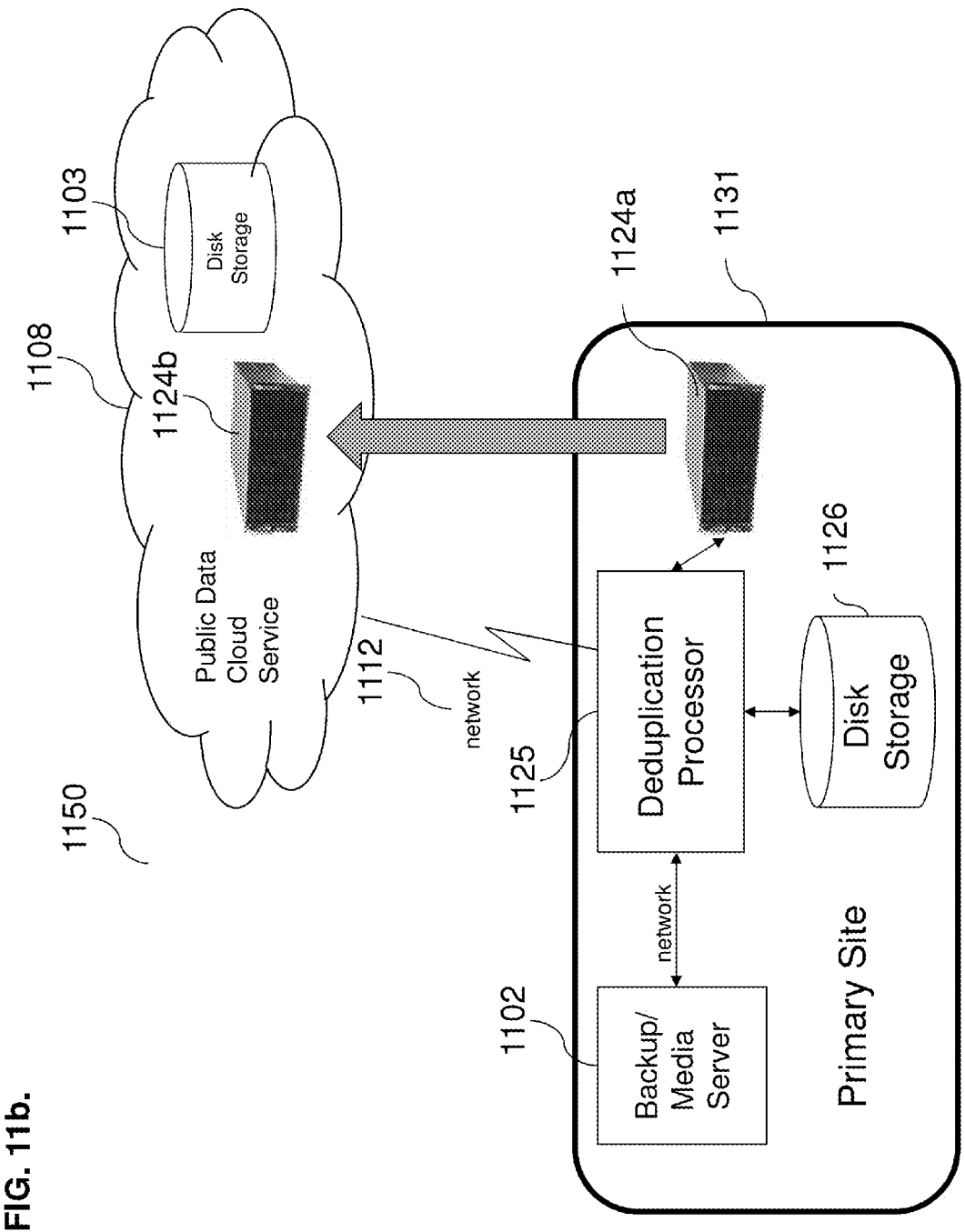
FIG. 11b illustrates an exemplary system for performing a bulk load operation to obtain data associated with a first backup placed into a public data storage cloud using a bulk loading, according to some implementations of the current subject matter.

FIG. 11b illustrates an exemplary two-site configuration system 1150 for storage of data using a public data cloud service, according to some implementations of the current subject matter. The system 1150 can includes a primary site 1131, a public data cloud service 1108 that can be coupled to the primary site 1131. The primary site 1131 can include a backup media server 1102, a deduplication processor 1125 communicating with a disk storage 1126, and a bulk load appliance 1124a that communicates with the deduplication processor 1125. The public data cloud service 1108 can include a disk storage 1103 and a bulk load appliance 1124b, the primary site can communicate with the public data cloud service 1108 via any suitable network (e.g., wireless, wired, MAN, WAN, LAN, etc.). The primary site 1131 can provide and/or upload data to the public data cloud service 1108 via the network 1112 for storage.

In some implementations, the network connection 1112 between the primary site 1131 and the public data cloud service 1108 can be relatively limited in bandwidth. When a primary site is initially backed up, the backup can involve replication of many large anchors and many small version deltas. Subsequent backups can send mostly small version deltas to the public data cloud service 1108 through the network 1112. Because the first backup load can take long time to replicate from the primary site 1131 to the public data cloud service 1108 through the network 1112, a bulk import option can be implemented to allow the initial large amount of data to be placed into the cloud, bypassing the network 1112. To perform a bulk import of data, bulk import appliances 1124a and 1124b can be used, which can be approved public data cloud service bulk load appliance 1124a, which can be loaded at the primary site 1131 by the deduplication processor 1125 with all of the content that needs to be placed into the public data cloud service 1108 after a cycle (e.g., a day, a week, a month, etc.) of backups have been completed. Once all of the data from a particular cycle of backups is loaded into the bulk load appliance 1124a, it can be physically shipped to the public data cloud service 1108, where the data can be copied from the bulk import appliance 1124b onto one or more disk storage 1103 units within the public data cloud service 1108.

In some implementations, file objects in the public cloud data service 1108 can be uniquely named by the public cloud data service 1108 using globally unique identifier ("GUIDs") names. Under a two-site operation, the primary site 1131 can be responsible for maintaining the mapping of actual local filenames and directories to public cloud data service 1108's objects' GUIDs. In some implementations, the current subject matter system can store and manage all associated metadata and data in the public cloud data service 1108 in such a way as to be able to recover from the total loss of all metadata and data stored at the primary site.

Figure 13:
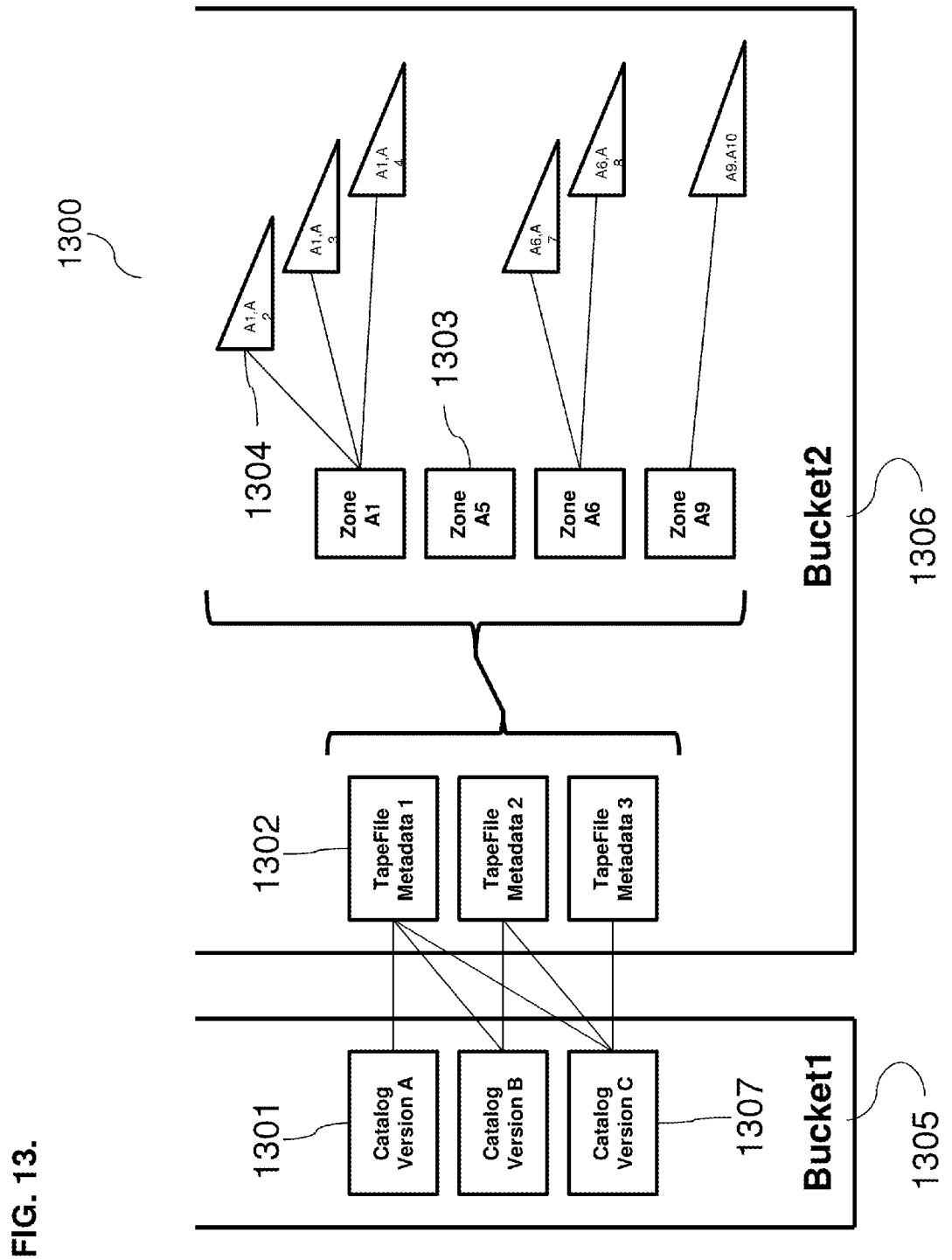
FIG. 13 illustrates an exemplary metadata structure allowing a public cloud data service to maintain metadata, according to some implementations of the current subject matter.

FIG. 13 illustrates an exemplary metadata structure 1300 that can allow the public data cloud service 1108 to maintain metadata that is self-describing in the event of a primary site disaster, according to some implementations of the current subject matter. FIG. 13 illustrates a metadata structure arranged in "bucket" 1 1305 and "bucket" 2 1306. The bucket 1 1305 can include a plurality of catalog versions A, B, C. The bucket 2 1306 can include a plurality of metadata tapefiles (i.e., large streaming data files) 1, 2, 3 1302. The catalog versions A, B, C can correspond to metadata contained in tapefiles 1302. The tapefiles' metadata can contain a plurality of file zones or anchors 1303 (e.g., "A1", "A5", "A6", "A9", etc.), each of which can include forward delta versions 1304. FIG. 13 further illustrates an exemplary metadata and data object files that can be stored in the public cloud data service 1108. The service 1108 can be maintained in order to survive a primary site disaster 1131. The data in the public data cloud service 1108 can be used to perform such recovery.

Figure 11C:
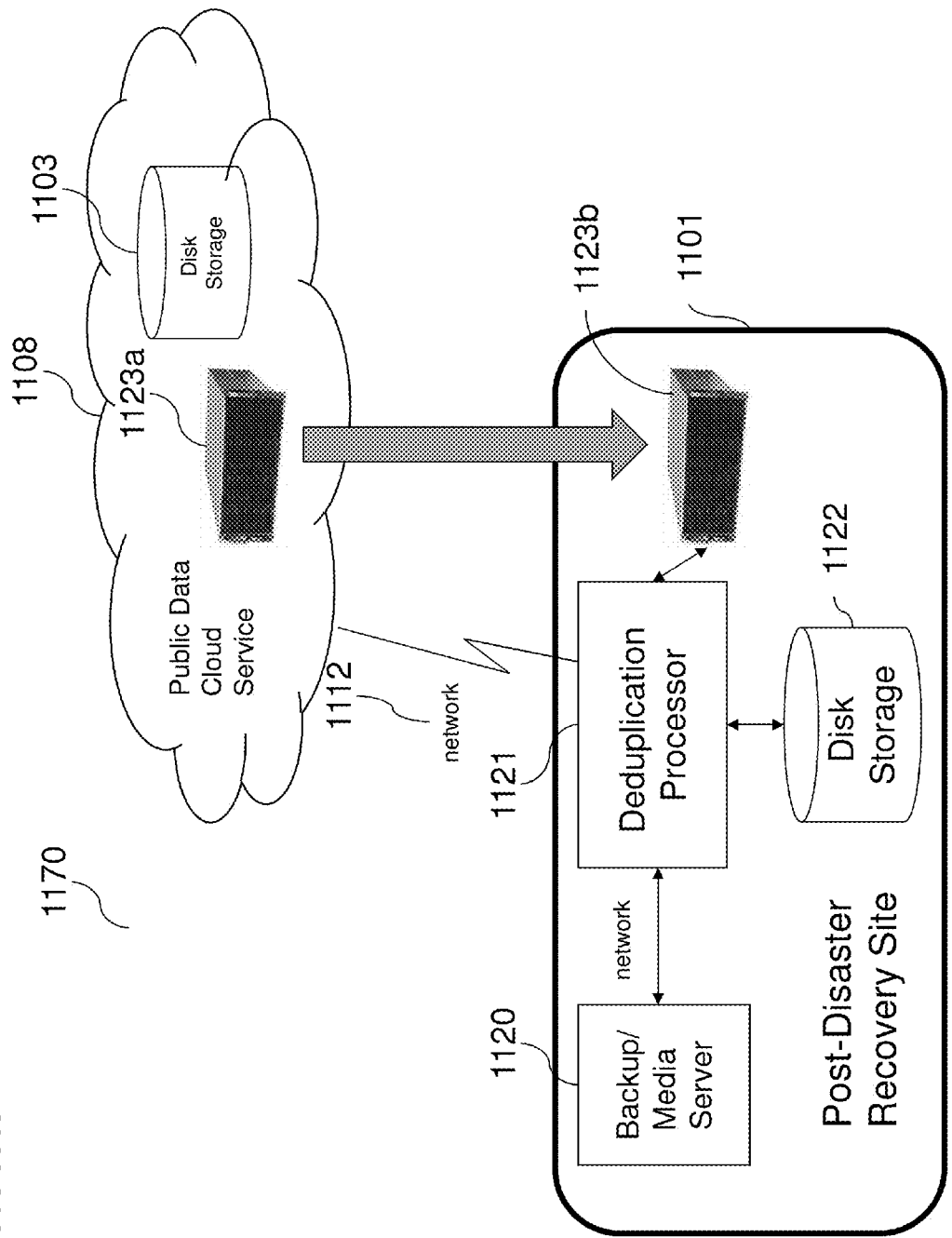
FIG. 11c illustrates an exemplary system for restoring data from a public data cloud service after an event (e.g., a primary site disaster), according to some implementations of the current subject matter.

FIG. 11c illustrates an exemplary two-site configuration 1170 for using a public data cloud service 1108 for performing a backup to a post-disaster recovery site 1101, according to some implementations of the current subject matter. The public data cloud service 1108 shown in FIG. 11b is similar to the public data cloud service 1108. In FIG. 11c, a bulk load appliance 1123a can be used to upload data to the post-disaster recovery site 1101. The site 1101 can include a back/media server 1120 communicating with the deduplication processor 1121 and a disk storage 1122 that communicates with the deduplication processor 1121. The deduplication processor 1121 can process the data from the bulk load appliance 1123b, which can be delivered to the site 1101 from the public data cloud service 1108.

Referring to FIGS. 11b, 11c, and 13, in some implementations, during execution of each backup job, the backup server can aggregate data from one or more backup clients into a tapefile. The deduplication processor 1125 at the primary site (as shown in FIG. 11b) can segment each tapefile into one or more zones. Some of these zones can become anchors 1303 (as shown in FIG. 13) and others can be deduplicated into delta-compressed files 1304. At the primary site 1131 (shown in FIG. 11b), the mapping of tapefiles to zones can be maintained in a database. At the disaster recover site 1101 (as shown in FIG. 11c) that can be realized using the public data cloud service 1108, tapefile to zone mappings are maintained in tapefile metadata files 1302. Each entry in the tapefile metadata file can represent a sequential ordering of anchor and delta zones that is assembled in order to recreate the original tapefile.

Based on backup retention limits, certain tapefiles can become obsolete over time. For example, a backup job with a three month retention period can be configured to only maintain the most recent three months of tapefiles. The catalog version file 1301 can be maintained at the public data cloud service 1108 and can represent a list of all active tapefiles by managing the links to their associated tapefile metadata files 1302.

All of the objects (i.e., catalog version files, tapefile metadata files, zones, etc. as shown in FIG. 13) can be stored in the public data cloud and can be referenced by a GUID. In the event of a complete primary site disaster, all of the metadata stored in the primary site 1131 that maps primary site's objects to public cloud data service 1108's objects can be lost. In this case, all data stored in the public data cloud service 1108 can be stored in a post disaster recover site 1101 (shown in FIG. 11c) in a similar fashion as discussed above with regard to FIG. 11b.

In some implementations, every time all of the zones associated with a new tapefile are successfully written to the public data cloud service 1108, a new tapefile metadata file 1302 (as shown in FIG. 13) can be stored in the cloud as well. Each tapefile metadata file can contain a list of GUIDs that can represent the zone files that make up the sequential byte stream of the original tapefile. One or more catalog version files 1301 can be maintained in the public data cloud service 1108. After the new tapefile metadata 1302 file is stored in the public data cloud service 1108, a new catalog version file 1301 can also be created. The catalog version file can maintain a list of all active tapefile metadata files. The most recent catalog version file can be the one selected to initiate the recovery procedures in the event of a primary site disaster.

In the event of a primary site disaster, a new post-disaster recovery site can be established. FIG. 11c displays a post-site disaster recovery site 1101 with a new backup/media server 1120, a new deduplication processor 1121 and new disk storage 1122 unit. At this point in the recovery process, the disk storage unit has no backup files.

The following challenges can exist in recovering many terabytes of backup data from a public data cloud service:
  it can take a long time (e.g., weeks, months, etc.) to return public data cloud files through the network that was used to send the data to the service;
  data that was sent by each client of the cloud storage service can be dispersed and comingled with other clients' data across multiple disparate servers and disk storage 1103.

To remedy these issues, the public data cloud service 1108 can provide an export service that can allow comingled data that is dispersed across disk storage 1103 (which can include a plurality of storage disks) in the cloud to be written to a private recovery disk storage unit 1123a, as shown in FIG. 11c. This operation can take hours to days to complete. Once all of the files that belong to the customer have been written to the private recovery disk unit 1123a, the unit can be provided (e.g., physically shipped) to the post-disaster recovery site 1101.

After a primary site disaster, the task of identifying the single most recent catalog version file 1307 stored among millions of zones and thousands of tapefile metadata files in the public cloud data service 1108 can be problematic since all of the files in the cloud are simply named by an opaque, non-descriptive GUID name. In order to locate the single most recent catalog version file, the current subject matter can leverage public cloud data service 1108's "buckets" 1305 and 1306 and date/timestamps of the object files. Public cloud data service 1108 can allow data to be stored in different "buckets" in order to isolate certain files from each other. In some implementations, a "bucket" can be similar to a filesystem directory. The catalog version files can be stored in their own "bucket" 1305, which can be separate from the "bucket" 1306 that can store tapefile metadata files and zone data files. The most recent catalog version file 1307 can be referenced in order to identify the tapefiles that are available to the backup media server 1120 that is performing the disaster recovery. This file can contain information that can be required to rebuild the metadata database that was lost in the primary site disaster. The most recent catalog version file can include a list of all active tapefiles in the catalog. These tapefile metadata files can be referenced by their public cloud data service GUID in the second "bucket" 1306 Likewise, each tapefile metadata file can sequentially list the zones (e.g., anchors, deltas, etc.) that can be required to recreate the original tapefile via their GUID object name. The original database that can be maintained at the primary site can be completely recreated at the post-disaster recovery site 1101 from the most recent catalog version file 1307, all of the Tapefile Metadata files 1302, all of the anchors 1303, forward delta zones 1304 and reverse delta zones (not shown in FIG. 13).

Figure 14:
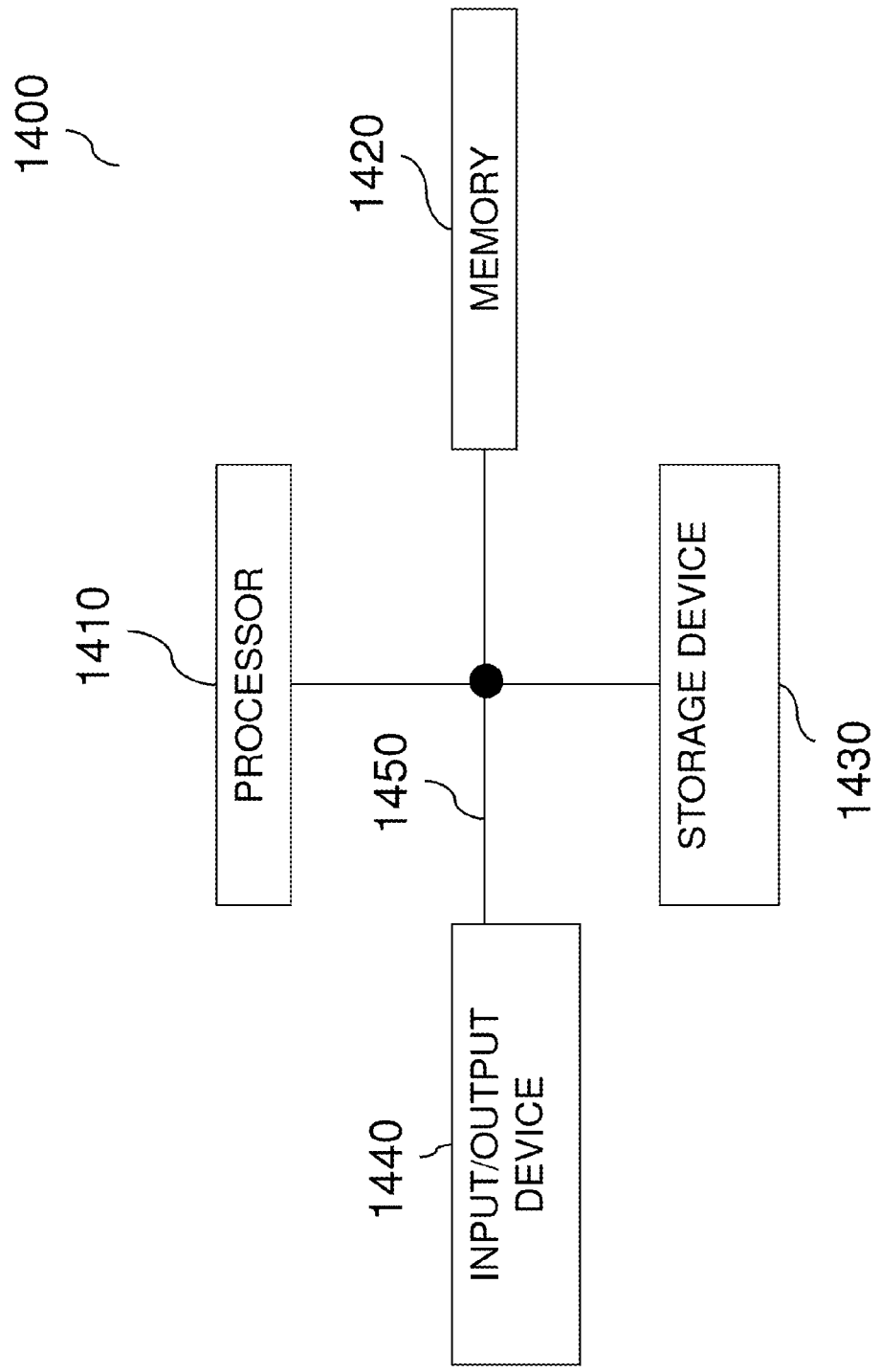
FIG. 14 illustrates an exemplary system, according to some implementations of the current subject matter.
Figure 15:
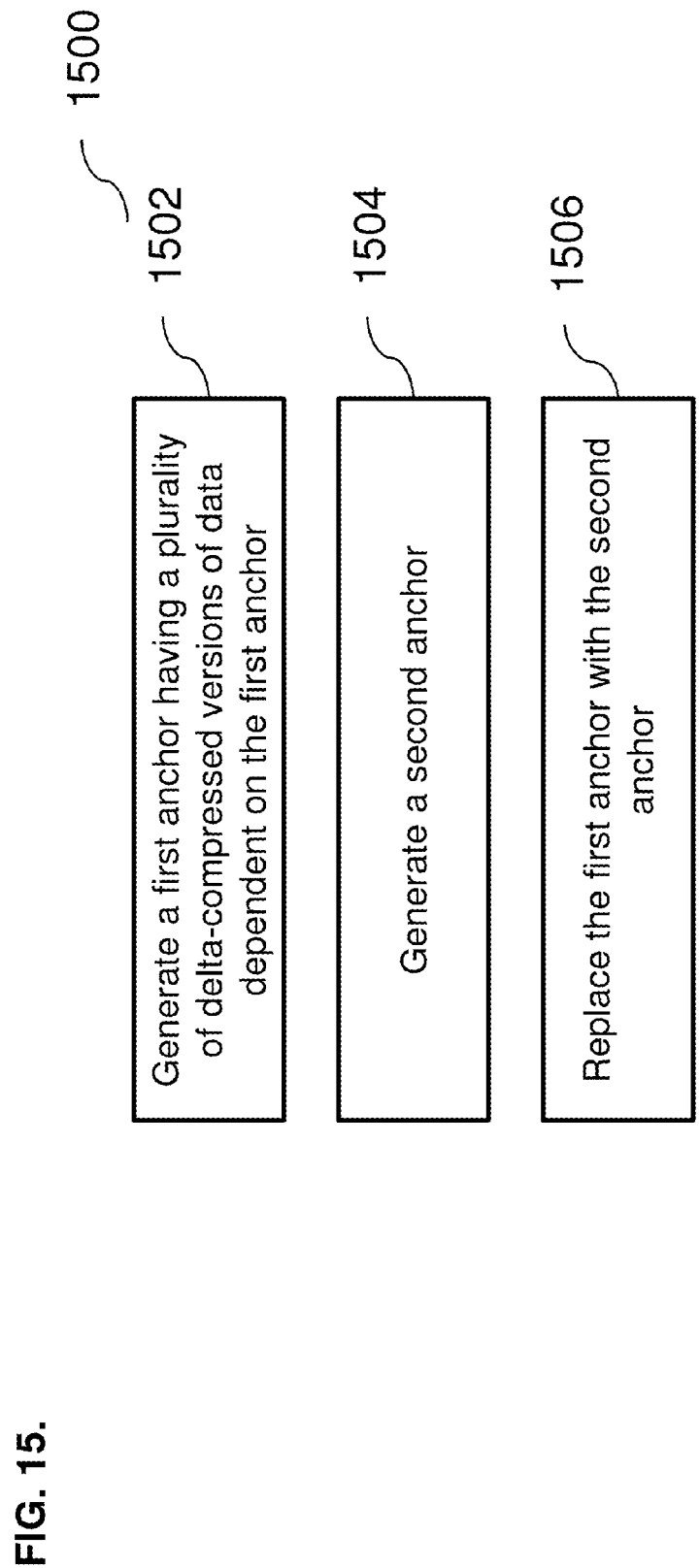
FIG. 15 illustrates an exemplary method, according to some implementations of the current subject matter.

In some implementations, the current subject matter can be configured to be implemented in a system 1400, as shown in FIG. 14. The system 1400 can include a processor 1410, a memory 1420, a storage device 1430, and an input/output device 1440. Each of the components 1410, 1420, 1430 and 1440 can be interconnected using a connection 1450. The processor 1410 can be configured to process instructions for execution within the system 1400. The processor 1410 can be further configured to process various instructions and perform operations that are stored in the memory 1420 or on the storage device 1430, including receiving or sending information through the input/output device 1440. The memory 1420 can store information within the system 1400. In some implementations, the memory 1420 can be a computer-readable medium, a volatile memory unit, a non-volatile memory unit, or any other suitable medium/unit. The storage device 1430 can be capable of providing mass storage for the system 1400 and can be a computer-readable medium, a floppy disk device, a hard disk device, an optical disk device, a tape device, non-volatile solid state memory, or any other suitable storage device. The input/output device 1440 can be a network interface and/or any other system, device, and/or any combination thereof.

In some implementations, the current subject matter relates to a method 1500 for performing a delta version clustering and reanchoring, according to some implementations of the current subject matter. At 1502, a first anchor can be generated. The first anchor can have a plurality of delta-compressed versions of data dependent on the first anchor. The first anchor and the plurality of delta-compressed versions can form a cluster. At 1504, a second anchor can be generated. At 1506, the first anchor can be replaced with the second anchor. The replacement of the first anchor with the second anchor can include re-computing at least one delta-compressed version in the plurality of delta-compressed versions to be dependent on the second anchor. The second anchor can replace the first anchor as an anchor of the cluster.

In some implementations, the current subject matter can include one or more of the following optional features. The second anchor can be created based on a determination that the plurality of versions meets at least one condition. At least one condition can include at least one of the following: a size of at least one zone in at least delta-compressed version, a number of delta-compressed versions associated with the first anchor, an age of the first anchor, and a zone stamp edit distance. In some implementations, the creation of the second anchor can include computing a reverse delta between the first anchor and the second anchor and delta-compressing the at least one delta-compressed version against the second anchor.

In some implementations, the method can further include storing the second anchor at a first storage location, receiving a new version of data, wherein the new version of data represents a version of data different from a version of data represented by at least one delta-compressed version of data in the plurality of delta-compressed versions, decompressing the second anchor at the first storage location, creating a forward delta-compressed version representative of the differences between the uncompressed second anchor and the received new version of data, and associating the created forward delta-compressed version with the second anchor. The method can further include storing the second anchor at a second storage location, transmitting the created forward delta-compressed version to the second storage location, and associating the second anchor stored at the second location with the transmitted forward delta-compressed version. In some implementations, the second storage location can be a disaster recovery storage location.

In some implementations, the method can include determining that the second anchor is to be deleted. This determination can include receiving a request to delete the second anchor and determining whether the second anchor includes at least one forward delta-compressed version dependent on the second anchor and marking the at least one forward delta-compressed version dependent on the second anchor for deletion. This determination can also include determining whether the second anchor includes only forward delta-compressed versions dependent on the second anchor, deleting all forward delta-compressed versions, and deleting the second anchor. The determination can also include determining whether the second anchor includes at least one reverse delta-compressed version dependent on the second anchor, wherein the at least one reverse delta-compressed version includes at least one forward delta-compressed version dependent on the at least one delta-compressed version, deleting all forward delta-compressed versions dependent on the at least one reverse delta-compressed version, deleting the at least one reverse delta-compressed version after deleting all forward delta-compressed versions dependent on the at least one reverse delta-compressed version, determining whether the second anchor includes forward delta-compressed versions dependent on the second anchor, deleting all forward delta-compressed versions dependent on the second anchor but not dependent on the at least one reverse delta-compressed version, and deleting the second anchor after deleting the at least one reverse delta-compressed version dependent on the second anchor and all forward delta-compressed versions dependent on the second anchor. In some implementations, the determination can further include determining whether the second anchor includes at least one of the following: a forward delta-compressed version dependent on the second anchor and a reverse delta-compressed version dependent on the second anchor, selecting at least one delta-compressed version as a third anchor, re-computing at least one delta-compressed version dependent on the second anchor to be dependent on the third anchor, associating the re-computed at least one delta-compressed version with the third anchor, and deleting the second anchor. The deletion of the selected anchor can be delayed until all forward delta-compressed versions that are dependent on the selected anchor are deleted. The deletion of the second anchor can be performed immediately after the third anchor is created.

In some implementations, the method can further include selecting a delta-compressed version in the plurality of versions for deletion, determining whether the selected delta-compressed version is a forward delta version, and deleting the selected forward delta version without deletion of the second anchor and other delta-compressed versions dependent on the second anchor.

In some implementations, the determination of whether to delete an anchor can include determining whether the second anchor includes at least one forward delta-compressed version and at least one reverse delta-compressed version dependent on the second anchor, deleting the at least one forward delta-compressed versions dependent on the second anchor, and preventing deletion of the second anchor until the at least one reverse delta-compressed version is deleted.

In some implementations, the method can further include accessing a version of data represented by a delta-compressed version of data dependent on the second anchor without decompressing another delta-compressed version of data dependent on the second anchor, whereby access time to the version of data is reduced.

In some implementations, the method can further include determining whether a delta-compressed version in the cluster is found to be unrecoverable. If the unrecoverable delta-compressed version is a forward delta-compressed version, then at least another delta-compressed version in the cluster can be recoverable. If the unrecoverable delta-compressed version is a reverse delta-compressed version, at least one forward delta-compressed version dependent on the unrecoverable reverse delta-compressed version can be unrecoverable and at least one delta-compressed version in the cluster that is not dependent on the unrecoverable reverse delta-compressed version can be recoverable.

In some implementations, the method can further include determining whether to duplicate the second anchor to create a copy of the second anchor, duplicating the second anchor. The determination of whether to duplicate the second anchor can be based on at least one of the following: size of the second cluster, a number of delta-compressed versions dependent on the second anchor, a number of delta-compressed versions added to the second cluster during a predetermined period of time, and a logical grouping of the second cluster and at least another version cluster. The first anchor can be stored in a first storage location and the duplicated second anchor is stored in a second storage location. In some implementations, the method can further include determining whether the second cluster is corrupted, and preventing duplication of the second cluster. The duplicating can include performing a checksum of the second cluster by splitting the second cluster into a plurality of data segments, performing a checksum of at least one data segment in the plurality of data segments, storing checksummed data segments, and logically aggregating the checksummed data segments into a third anchor for replacing the second anchor.

In some implementations, the method can further include storing the cluster anchored by the second anchor at a first storage location and storing the cluster anchored by the second anchor at a second storage location without re-computing the second cluster. The second storage location can be a cloud storage. Storing at the second storage location can include storing metadata associated with the second cluster at the second storage location and a catalog file, wherein the stored metadata is used to update the stored second cluster at the second storage location based on an update to the stored second cluster at the first storage location and the catalog file includes at least one pointer to a metadata having a link to an actual data represented by the metadata. The update can include at least one of the following: deletion of the at least one delta-compressed version dependent on the second anchor, addition of a new delta-compressed version to be dependent on the second anchor, deletion of the second anchor, and changing the second cluster. The metadata can include at least of the second anchor and the delta-compressed versions dependent on the second anchor. The stored metadata can be used to recreate the second anchor and the delta-compressed versions dependent on the second anchor in the event of an unavailability of the first storage location. The catalog file can be a most recent catalog file containing a list of all active tapefiles representing data stored at the first storage location. The most recent catalog file can be referenced when recreating at least one version of data at the second storage location in the event of an unavailability of the first storage location.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
   generating a first anchor in a plurality of anchors having a plurality of delta-compressed versions of data dependent on the first anchor, wherein the first anchor being at least one of the following: a version of data and a delta-compressed version of the data,
   wherein the plurality of delta-compressed versions includes delta-compressed versions that do not linearly depend on one another, each delta-compressed version in at least a portion of the delta-compressed versions in the plurality of delta-compressed versions is computed against the first anchor, the first anchor and the plurality of delta-compressed versions form a cluster;
   generating a decompressed second anchor in the plurality of anchors, wherein the decompressed second anchor includes at least another version of the data; and
   replacing the first anchor with the generated decompressed second anchor,
   wherein the replacing includes
      decompressing the first anchor to generate a decompressed first anchor;
      determining a difference between the decompressed first anchor and the generated decompressed second anchor;
      generating a first reverse delta-compressed version representative of the determined difference between the decompressed first anchor and the generated decompressed second anchor, wherein the first reverse delta-compressed version is dependent on the generated decompressed second anchor, wherein each delta-compressed version in the at least a portion of the delta-compressed versions being previously dependent on the first anchor is computed to be dependent on the first reversed delta-compressed version;
      re-computing, using the determined difference between the decompressed first anchor and the generated decompressed second anchor, at least one delta-compressed version in the plurality of delta-compressed versions to be dependent on the generated decompressed second anchor, wherein the re-computed at least one delta-compressed version is delta-compressed against the generated decompressed second anchor; and
      compressing the generated decompressed second anchor, wherein the compressed second anchor replaces the first anchor as an anchor of the cluster;
   wherein at least one of the generating the first anchor, the generating the decompressed second anchor, and the replacing is performed on at least one processor.

2. The method according to claim 1, wherein the decompressed second anchor is created based on a determination that the plurality of versions meets at least one condition.

3. The method according to claim 2, wherein the at least one condition includes at least one of the following: a size of at least one zone in at least delta-compressed version, a number of delta-compressed versions associated with the first anchor, an age of the first anchor, and a zone stamp edit distance.

4. The method according to claim 2, wherein the decompressed second anchor is created by
computing a reverse delta between the first anchor and the decompressed second anchor; and
delta-compressing the at least one delta-compressed version against the decompressed second anchor.

5. The method according to claim 1, further comprising
storing the compressed second anchor at a first storage location;
receiving a new version of data, wherein the new version of data represents a version of data different from a version of data represented by at least one delta-compressed version of data in the plurality of delta-compressed versions;
decompressing the compressed second anchor at the first storage location;
creating a forward delta-compressed version representative of the differences between the decompressed second anchor and the received new version of data; and
associating the created forward delta-compressed version with the decompressed second anchor.

6. The method according to claim 5, further comprising
storing the decompressed second anchor at a second storage location;
transmitting the created forward delta-compressed version to the second storage location; and
associating the decompressed second anchor stored at the second location with the transmitted forward delta-compressed version.

7. The method according to claim 6, wherein the second storage location is a disaster recovery storage location.

8. The method according to claim 1, further comprising determining that the compressed second anchor is to be deleted;
wherein the determining includes
receiving a request to delete the compressed second anchor; and
determining whether the compressed second anchor includes at least one forward delta-compressed version dependent on the compressed second anchor and marking the at least one forward delta-compressed version dependent on the compressed second anchor for deletion.

9. The method according to claim 8, wherein the determining further comprises
determining whether the compressed second anchor includes only forward delta-compressed versions dependent on the compressed second anchor;
deleting all forward delta-compressed versions; and
deleting the compressed second anchor.

10. The method according to claim 8, wherein the determining further comprises:
determining whether the compressed second anchor includes at least one reverse delta-compressed version dependent on the compressed second anchor, wherein the at least one reverse delta-compressed version includes at least one forward delta-compressed version dependent on the at least one delta-compressed version;
deleting all forward delta-compressed versions dependent on the at least one reverse delta-compressed version;
deleting the at least one reverse delta-compressed version after deleting all forward delta-compressed versions dependent on the at least one reverse delta-compressed version;
determining whether the compressed second anchor includes forward delta-compressed versions dependent on the compressed second anchor;
deleting all forward delta-compressed versions dependent on the compressed second anchor but not dependent on the at least one reverse delta-compressed version; and
deleting the compressed second anchor after deleting the at least one reverse delta-compressed version dependent on the second anchor and all forward delta-compressed versions dependent on the compressed second anchor.

11. The method according to claim 8, wherein the determining further comprises:
determining whether the compressed second anchor includes at least one of the following: a forward delta-compressed version dependent on the compressed second anchor and a reverse delta-compressed version dependent on the compressed second anchor;
selecting at least one delta-compressed version as a third anchor;
re-computing at least one delta-compressed version dependent on the compressed second anchor to be dependent on the third anchor;
associating the re-computed at least one delta-compressed version with the third anchor; and
deleting the compressed second anchor.

12. The method according to claim 9, wherein the deleting the selected anchor is delayed until all forward delta-compressed versions that are dependent on the selected anchor are deleted.

13. The method according to claim 11, wherein the deleting of the compressed second anchor is performed immediately after the third anchor is created.

14. The method according to claim 1, further comprising:
selecting a delta-compressed version in the plurality of versions for deletion;
determining whether the selected delta-compressed version is a forward delta version; and
deleting the selected forward delta version without deletion of the compressed second anchor and other delta-compressed versions dependent on the compressed second anchor.

15. The method according to claim 8, wherein the determining further comprises
determining whether the compressed second anchor includes at least one forward delta-compressed version and at least one reverse delta-compressed version dependent on the compressed second anchor;
deleting the at least one forward delta-compressed versions dependent on the compressed second anchor; and
preventing deletion of the compressed second anchor until the at least one reverse delta-compressed version is deleted.

16. The method according to claim 1, further comprising
accessing a version of data represented by a delta-compressed version of data dependent on the compressed second anchor without decompressing another delta-compressed version of data dependent on the compressed second anchor, whereby access time to the version of data is reduced.

17. The method according to claim 1, further comprising determining whether a delta-compressed version in the cluster is found to be unrecoverable;
wherein if the unrecoverable delta-compressed version is a forward delta-compressed version, at least another delta-compressed version in the cluster is recoverable;
wherein if the unrecoverable delta-compressed version is a reverse delta-compressed version, at least one forward delta-compressed version dependent on the unrecoverable reverse delta-compressed version is unrecoverable and at least one delta-compressed version in the cluster that is not dependent on the unrecoverable reverse delta-compressed version is recoverable.

18. The method according to claim 1, further comprising: determining whether to duplicate the second anchor to create a copy of the compressed second anchor;
duplicating the compressed second anchor;
wherein the determination of whether to duplicate the compressed second anchor is based on at least one of the following: size of the second cluster, a number of delta-compressed versions dependent on the compressed second anchor, a number of delta-compressed versions added to the second cluster during a predetermined period of time, and a logical grouping of the second cluster and at least another version cluster.

19. The method according to claim 18, wherein the first anchor is stored in a first storage location and the duplicated compressed second anchor is stored in a second storage location.

20. The method according to claim 18, further comprising determining whether the second cluster is corrupted; and preventing duplication of the second cluster.

21. The method according to claim 18, wherein the duplicating further comprises
performing a checksum of the second cluster by
splitting the second cluster into a plurality of data segments;
performing a checksum of at least one data segment in the plurality of data segments;
storing checksummed data segments; and
logically aggregating the checksummed data segments into a third anchor for replacing the compressed second anchor.

22. The method according to claim 1, further comprising
storing the cluster anchored by the compressed second anchor at a first storage location; and
storing the cluster anchored by the compressed second anchor at a second storage location without re-computing the second cluster.

23. The method according to claim 22, wherein the second storage location is a cloud storage.

24. The method according to claim 22, wherein the storing at the second storage location further comprises
storing metadata associated with the second cluster at the second storage location and a catalog file, wherein the stored metadata is used to update the stored second cluster at the second storage location based on an update to the stored second cluster at the first storage location and the catalog file includes at least one pointer to a metadata having a link to an actual data represented by the metadata.

25. The method according to claim 24, wherein the update includes at least one of the following: deletion of the at least one delta-compressed version dependent on the compressed second anchor, addition of a new delta-compressed version to be dependent on the compressed second anchor, deletion of the compressed second anchor, and changing the second cluster.

26. The method according to claim 24, wherein the metadata includes at least of the compressed second anchor and the delta-compressed versions dependent on the compressed second anchor;
wherein the stored metadata is used to recreate the compressed second anchor and the delta-compressed versions dependent on the compressed second anchor in the event of an unavailability of the first storage location.

27. The method according to claim 26, wherein the catalog file is a most recent catalog file containing a list of all active tapefiles representing data stored at the first storage location;
wherein the most recent catalog file is referenced when recreating at least one version of data at the second storage location in the event of an unavailability of the first storage location.

28. A system for storing data, comprising:
at least one processor; and
at least one machine-readable medium storing instructions that, when executed by the at least one processor, cause the at least one processor to perform operations comprising:
generating a first anchor in a plurality of anchors having a plurality of delta-compressed versions of data dependent on the first anchor, wherein the first anchor being at least one of the following: a version of data and a delta-compressed version of the data,
wherein the plurality of delta-compressed versions includes delta-compressed versions that do not linearly depend on one another, each delta-compressed version in at least a portion of the delta-compressed versions in the plurality of delta-compressed versions is computed against the first anchor, the first anchor and the plurality of delta-compressed versions form a cluster;
generating a decompressed second anchor in the plurality of anchors, wherein the decompressed second anchor includes at least another version of the data; and
replacing the first anchor with the generated decompressed second anchor,
wherein the replacing includes
decompressing the first anchor to generate a decompressed first anchor;
determining a difference between the decompressed first anchor and the generated decompressed second anchor;
generating a first reverse delta-compressed version representative of the determined difference between the decompressed first anchor and the generated decompressed second anchor, wherein the first reverse delta-compressed version is dependent on the generated decompressed second anchor, wherein each delta-compressed version in the at least a portion of the delta-compressed versions being previously dependent on the first anchor is computed to be dependent on the first reversed delta-compressed version;
re-computing, using the determined difference between the decompressed first anchor and the generated decompressed second anchor, at least one delta-compressed version in the plurality of delta-compressed versions to be dependent on the generated decompressed second anchor, wherein the re-computed at least one delta-compressed version is delta-compressed against the generated decompressed second anchor; and compressing the generated decompressed second anchor, wherein the compressed second anchor replaces the first anchor as an anchor of the cluster.

29. The system according to claim 28, wherein the decompressed second anchor is created based on a determination that the plurality of versions meets at least one condition.

30. The system according to claim 29, wherein the at least one condition includes at least one of the following: a size of at least one zone in at least delta-compressed version, a number of delta-compressed versions associated with the first anchor, an age of the first anchor, and a zone stamp edit distance.

31. The system according to claim 29, wherein the decompressed second anchor is created by computing a reverse delta between the first anchor and the decompressed second anchor; and delta-compressing the at least one delta-compressed version against the decompressed second anchor.

32. The system according to claim 28, wherein the operations further comprise storing the compressed second anchor at a first storage location;

receiving a new version of data, wherein the new version of data represents a version of data different from a version of data represented by at least one delta-compressed version of data in the plurality of delta-compressed versions;

decompressing the compressed second anchor at the first storage location;

creating a forward delta-compressed version representative of the differences between the decompressed second anchor and the received new version of data; and associating the created forward delta-compressed version with the decompressed second anchor.

33. The system according to claim 32, wherein the operations further comprise storing the decompressed second anchor at a second storage location;

transmitting the created forward delta-compressed version to the second storage location; and associating the decompressed second anchor stored at the second location with the transmitted forward delta-compressed version.

34. The system according to claim 33, wherein the second storage location is a disaster recovery storage location.

35. The system according to claim 28, further comprising determining that the compressed second anchor is to be deleted;

wherein the determining includes receiving a request to delete the compressed second anchor; and determining whether the second anchor includes at least one forward delta-compressed version dependent on the compressed second anchor and marking the at least one forward delta-compressed version dependent on the second anchor for deletion.

36. The system according to claim 35, wherein the determining further comprises determining whether the second anchor includes only forward delta-compressed versions dependent on the compressed second anchor;

deleting all forward delta-compressed versions; and deleting the compressed second anchor.

37. The system according to claim 35, wherein the determining further comprises:

determining whether the compressed second anchor includes at least one reverse delta-compressed version dependent on the compressed second anchor, wherein the at least one reverse delta-compressed version includes at least one forward delta-compressed version dependent on the at least one delta-compressed version;

deleting all forward delta-compressed versions dependent on the at least one reverse delta-compressed version;

deleting the at least one reverse delta-compressed version after deleting all forward delta-compressed versions dependent on the at least one reverse delta-compressed version;

determining whether the compressed second anchor includes forward delta-compressed versions dependent on the compressed second anchor;

deleting all forward delta-compressed versions dependent on the compressed second anchor but not dependent on the at least one reverse delta-compressed version; and deleting the compressed second anchor after deleting the at least one reverse delta-compressed version dependent on the compressed second anchor and all forward delta-compressed versions dependent on the compressed second anchor.

38. The system according to claim 35, wherein the determining further comprises:

determining whether the compressed second anchor includes at least one of the following: a forward delta-compressed version dependent on the compressed second anchor and a reverse delta-compressed version dependent on the compressed second anchor;

selecting at least one delta-compressed version as a third anchor;

re-computing at least one delta-compressed version dependent on the compressed second anchor to be dependent on the third anchor;

associating the re-computed at least one delta-compressed version with the third anchor; and deleting the compressed second anchor.

39. The system according to claim 36, wherein the deleting the selected anchor is delayed until all forward delta-compressed versions that are dependent on the selected anchor are deleted.

40. The system according to claim 38, wherein the deleting of the compressed second anchor is performed immediately after the third anchor is created.

41. The system according to claim 28, wherein the operations further comprise selecting a delta-compressed version in the plurality of versions for deletion;

determining whether the selected delta-compressed version is a forward delta version; and deleting the selected forward delta version without deletion of the compressed second anchor and other delta-compressed versions dependent on the compressed second anchor.

42. The system according to claim 35, wherein the determining further comprises determining whether the compressed second anchor includes at least one forward delta-compressed version and at least one reverse delta-compressed version dependent on the compressed second anchor;

deleting the at least one forward delta-compressed versions dependent on the compressed second anchor; and preventing deletion of the second anchor until the at least one reverse delta-compressed version is deleted.

43. The system according to claim 28, wherein the operations further comprise
    accessing a version of data represented by a delta-compressed version of data dependent on the compressed second anchor without decompressing another delta-compressed version of data dependent on the compressed second anchor, whereby access time to the version of data is reduced.

44. The system according to claim 28, wherein the operations further comprise
    determining whether a delta-compressed version in the cluster is found to be unrecoverable;
    wherein if the unrecoverable delta-compressed version is a forward delta-compressed version, at least another delta-compressed version in the cluster is recoverable;
    wherein if the unrecoverable delta-compressed version is a reverse delta-compressed version, at least one forward delta-compressed version dependent on the unrecoverable reverse delta-compressed version is unrecoverable and at least one delta-compressed version in the cluster that is not dependent on the unrecoverable reverse delta-compressed version is recoverable.

45. The system according to claim 28, wherein the operations further comprise
    determining whether to duplicate the compressed second anchor to create a copy of the second anchor;
    duplicating the compressed second anchor;
    wherein the determination of whether to duplicate the compressed second anchor is based on at least one of the following: size of the second cluster, a number of delta-compressed versions dependent on the compressed second anchor, a number of delta-compressed versions added to the second cluster during a predetermined period of time, and a logical grouping of the second cluster and at least another version cluster.

46. The system according to claim 45, wherein the first anchor is stored in a first storage location and the duplicated compressed second anchor is stored in a second storage location.

47. The system according to claim 45, wherein the operations further comprise
    determining whether the second cluster is corrupted; and
    preventing duplication of the second cluster.

48. The system according to claim 45, wherein the duplicating further comprises
    performing a checksum of the second cluster by
        splitting the second cluster into a plurality of data segments;
        performing a checksum of at least one data segment in the plurality of data segments;
        storing checksummed data segments; and
        logically aggregating the checksummed data segments into a third anchor for replacing the compressed second anchor.

49. The system according to claim 28, wherein the operations further comprise
    storing the cluster anchored by the compressed second anchor at a first storage location; and
    storing the cluster anchored by the compressed second anchor at a second storage location without re-computing the second cluster.

50. The system according to claim 49, wherein the second storage location is a cloud storage.

51. The system according to claim 49, wherein the storing at the second storage location further comprises
    storing metadata associated with the second cluster at the second storage location and a catalog file, wherein the stored metadata is used to update the stored second cluster at the second storage location based on an update to the stored second cluster at the first storage location and the catalog file includes at least one pointer to a metadata having a link to an actual data represented by the metadata.

52. The system according to claim 51, wherein the update includes at least one of the following: deletion of the at least one delta-compressed version dependent on the compressed second anchor, addition of a new delta-compressed version to be dependent on the compressed second anchor, deletion of the compressed second anchor, and changing the second cluster.

53. The system according to claim 51, wherein the metadata includes at least of the second anchor and the delta-compressed versions dependent on the compressed second anchor;
    wherein the stored metadata is used to recreate the compressed second anchor and the delta-compressed versions dependent on the compressed second anchor in the event of an unavailability of the first storage location.

54. The system according to claim 53, wherein the catalog file is a most recent catalog file containing a list of all active tapefiles representing data stored at the first storage location;
    wherein the most recent catalog file is referenced when recreating at least one version of data at the second storage location in the event of an unavailability of the first storage location.

55. A computer program product comprising non-transitory machine-readable medium storing instructions that, when executed by the at least one processor, cause the at least one processor to perform operations comprising:
    generating a first anchor in a plurality of anchors having a plurality of delta-compressed versions of data dependent on the first anchor, wherein the first anchor being at least one of the following: a version of data and a delta-compressed version of the data,
    wherein the plurality of delta-compressed versions includes delta-compressed versions that do not linearly depend on one another, each delta-compressed version in at least a portion of the delta-compressed versions in the plurality of delta-compressed versions is computed against the first anchor, the first anchor and the plurality of delta-compressed versions form a cluster;
    generating a decompressed second anchor in the plurality of anchors, wherein the decompressed second anchor includes at least another version of the data; and
    replacing the first anchor with the generated decompressed second anchor,
    wherein the replacing includes
        decompressing the first anchor to generate a decompressed first anchor;
        determining a difference between the decompressed first anchor and the generated decompressed second anchor;
        generating a first reverse delta-compressed version representative of the determined difference between the decompressed first anchor and the generated decompressed second anchor, wherein the first reverse delta-compressed version is dependent on the generated decompressed second anchor, wherein each delta-compressed version in the at least a portion of the delta-compressed versions being previously dependent on the first anchor is computed to be dependent on the first reversed delta-compressed version;

re-computing, using the determined difference between the decompressed first anchor and the generated decompressed second anchor, at least one delta-compressed version in the plurality of delta-compressed versions to be dependent on the generated decompressed second anchor, wherein the re-computed at least one delta-compressed version is delta-compressed against the generated decompressed second anchor; and compressing the generated decompressed second anchor, wherein the compressed second anchor replaces the first anchor as an anchor of the cluster.

56. The computer program product according to claim 55, wherein the decompressed second anchor is created based on a determination that the plurality of versions meets at least one condition.

57. The computer program product according to claim 56, wherein the at least one condition includes at least one of the following: a size of at least one zone in at least delta-compressed version, a number of delta-compressed versions associated with the first anchor, an age of the first anchor, and a zone stamp edit distance.

58. The computer program product according to claim 56, wherein the decompressed second anchor is created by
    computing a reverse delta between the first anchor and the decompressed second anchor; and
    delta-compressing the at least one delta-compressed version against the decompressed second anchor.

59. The computer program product according to claim 55, wherein the operations further comprise
    storing the compressed second anchor at a first storage location;
    receiving a new version of data, wherein the new version of data represents a version of data different from a version of data represented by at least one delta-compressed version of data in the plurality of delta-compressed versions;
    decompressing the compressed second anchor at the first storage location;
    creating a forward delta-compressed version representative of the differences between the decompressed second anchor and the received new version of data; and
    associating the created forward delta-compressed version with the decompressed second anchor.

60. The computer program product according to claim 59, wherein the operations further comprise
    storing the decompressed second anchor at a second storage location;
    transmitting the created forward delta-compressed version to the second storage location; and
    associating the decompressed second anchor stored at the second location with the transmitted forward delta-compressed version.

61. The computer program product according to claim 60, wherein the second storage location is a disaster recovery storage location.

62. The computer program product according to claim 55, further comprising determining that the compressed second anchor is to be deleted;
    wherein the determining includes
        receiving a request to delete the compressed second anchor; and
        determining whether the compressed second anchor includes at least one forward delta-compressed version dependent on the compressed second anchor and marking the at least one forward delta-compressed version dependent on the compressed second anchor for deletion.

63. The computer program product according to claim 62, wherein the determining further comprises
    determining whether the second anchor includes only forward delta-compressed versions dependent on the compressed second anchor;
    deleting all forward delta-compressed versions; and
    deleting the compressed second anchor.

64. The computer program product according to claim 62, wherein the determining further comprises:
    determining whether the compressed second anchor includes at least one reverse delta-compressed version dependent on the compressed second anchor, wherein the at least one reverse delta-compressed version includes at least one forward delta-compressed version dependent on the at least one delta-compressed version;
    deleting all forward delta-compressed versions dependent on the at least one reverse delta-compressed version;
    deleting the at least one reverse delta-compressed version after deleting all forward delta-compressed versions dependent on the at least one reverse delta-compressed version;
    determining whether the compressed second anchor includes forward delta-compressed versions dependent on the compressed second anchor;
    deleting all forward delta-compressed versions dependent on the compressed second anchor but not dependent on the at least one reverse delta-compressed version; and
    deleting the compressed second anchor after deleting the at least one reverse delta-compressed version dependent on the compressed second anchor and all forward delta-compressed versions dependent on the compressed second anchor.

65. The computer program product according to claim 62, wherein the determining further comprises:
    determining whether the compressed second anchor includes at least one of the following: a forward delta-compressed version dependent on the compressed second anchor and a reverse delta-compressed version dependent on the compressed second anchor;
    selecting at least one delta-compressed version as a third anchor;
    re-computing at least one delta-compressed version dependent on the compressed second anchor to be dependent on the third anchor;
    associating the re-computed at least one delta-compressed version with the third anchor; and
    deleting the compressed second anchor.

66. The computer program product according to claim 63, wherein the deleting the selected anchor is delayed until all forward delta-compressed versions that are dependent on the selected anchor are deleted.

67. The computer program product according to claim 65, wherein the deleting of the compressed second anchor is performed immediately after the third anchor is created.

68. The computer program product according to claim 55, wherein the operations further comprise
    selecting a delta-compressed version in the plurality of versions for deletion;
    determining whether the selected delta-compressed version is a forward delta version; and
    deleting the selected forward delta version without deletion of the compressed second anchor and other delta-compressed versions dependent on the compressed second anchor.

69. The computer program product according to claim 62, wherein the determining further comprises
    determining whether the compressed second anchor includes at least one forward delta-compressed version and at least one reverse delta-compressed version dependent on the compressed second anchor;
    deleting the at least one forward delta-compressed versions dependent on the compressed second anchor; and
    preventing deletion of the compressed second anchor until the at least one reverse delta-compressed version is deleted.

70. The computer program product according to claim 55, wherein the operations further comprise
    accessing a version of data represented by a delta-compressed version of data dependent on the compressed second anchor without decompressing another delta-compressed version of data dependent on the compressed second anchor, whereby access time to the version of data is reduced.

71. The computer program product according to claim 55, wherein the operations further comprise
    determining whether a delta-compressed version in the cluster is found to be unrecoverable;
    wherein if the unrecoverable delta-compressed version is a forward delta-compressed version, at least another delta-compressed version in the cluster is recoverable;
    wherein if the unrecoverable delta-compressed version is a reverse delta-compressed version, at least one forward delta-compressed version dependent on the unrecoverable reverse delta-compressed version is unrecoverable and at least one delta-compressed version in the cluster that is not dependent on the unrecoverable reverse delta-compressed version is recoverable.

72. The computer program product according to claim 55, wherein the operations further comprise
    determining whether to duplicate the second anchor to create a copy of the compressed second anchor;
    duplicating the compressed second anchor;
    wherein the determination of whether to duplicate the compressed second anchor is based on at least one of the following: size of the second cluster, a number of delta-compressed versions dependent on the compressed second anchor, a number of delta-compressed versions added to the second cluster during a predetermined period of time, and a logical grouping of the second cluster and at least another version cluster.

73. The computer program product according to claim 72, wherein the first anchor is stored in a first storage location and the duplicated compressed second anchor is stored in a second storage location.

74. The computer program product according to claim 72, wherein the operations further comprise
    determining whether the second cluster is corrupted; and
    preventing duplication of the second cluster.

75. The computer program product according to claim 72, wherein the duplicating further comprises
    performing a checksum of the second cluster by
        splitting the second cluster into a plurality of data segments;
        performing a checksum of at least one data segment in the plurality of data segments;
        storing checksummed data segments; and
        logically aggregating the checksummed data segments into a third anchor for replacing the compressed second anchor.

76. The computer program product according to claim 55, wherein the operations further comprise
    storing the cluster anchored by the compressed second anchor at a first storage location; and
    storing the cluster anchored by the compressed second anchor at a second storage location without re-computing the second cluster.

77. The computer program product according to claim 76, wherein the second storage location is a cloud storage.

78. The computer program product according to claim 76, wherein the storing at the second storage location further comprises
    storing metadata associated with the second cluster at the second storage location and a catalog file, wherein the stored metadata is used to update the stored second cluster at the second storage location based on an update to the stored second cluster at the first storage location and the catalog file includes at least one pointer to a metadata having a link to an actual data represented by the metadata.

79. The computer program product according to claim 78, wherein the update includes at least one of the following: deletion of the at least one delta-compressed version dependent on the compressed second anchor, addition of a new delta-compressed version to be dependent on the compressed second anchor, deletion of the compressed second anchor, and changing the second cluster.

80. The computer program product according to claim 78, wherein the metadata includes at least of the compressed second anchor and the delta-compressed versions dependent on the compressed second anchor;
    wherein the stored metadata is used to recreate the compressed second anchor and the delta-compressed versions dependent on the compressed second anchor in the event of an unavailability of the first storage location.

81. The computer program product according to claim 80, wherein the catalog file is a most recent catalog file containing a list of all active tapefiles representing data stored at the first storage location;
    wherein the most recent catalog file is referenced when recreating at least one version of data at the second storage location in the event of an unavailability of the first storage location.

* * * * *